United States Patent
Yamamoto et al.

(10) Patent No.: US 6,607,253 B1
(45) Date of Patent: Aug. 19, 2003

(54) BRAKING TORQUE CONTROL APPARATUS AND METHOD

(75) Inventors: Takayuki Yamamoto, Aichi-gun (JP); Keiji Murashima, Gotenba (JP); Naoki Sawada, Anjo (JP)

(73) Assignees: Toyota Jidosha Kabushiki Kaisha, Tokyo (JP); Denso Corporation, Kariya (JP)

( * ) Notice: Subject to any disclaimer, the term of this patent is extended or adjusted under 35 U.S.C. 154(b) by 0 days.

(21) Appl. No.: 09/702,730

(22) Filed: Nov. 1, 2000

(30) Foreign Application Priority Data

Nov. 1, 1999 (JP) .......................... 11-311010
Aug. 29, 2000 (JP) ........................ 2000-259842

(51) Int. Cl.⁷ ................................. H02K 7/10
(52) U.S. Cl. ................... 303/112; 188/181 T; 188/72.1; 303/155
(58) Field of Search ............... 188/181 T; 303/112, 303/152, 157, 155, 203, 15

(56) References Cited

U.S. PATENT DOCUMENTS

| | | | |
|---|---|---|---|
| 4,615,419 A | 10/1986 | Gaiser | |
| 5,577,812 A | * 11/1996 | Hirano et al. | 303/112 |
| 6,008,604 A | * 12/1999 | Maisch | 188/72.1 |
| 6,158,822 A | * 12/2000 | Shirai et al. | 303/112 |
| 6,270,172 B1 | * 8/2001 | Shirai et al. | 303/152 |

FOREIGN PATENT DOCUMENTS

| | | |
|---|---|---|
| DE | 195 26 645 A | 1/1997 |
| DE | 197 42 988 | 1/1999 |
| DE | 198 32 167 | 5/1999 |
| EP | 0 894 685 A | 2/1999 |
| EP | 953 785 | 11/1999 |
| JP | (P) HEI 10-109631 | 4/1998 |
| JP | (P) HEI 11-43041 | 2/1999 |
| JP | (P) HEI 11-99933 | 4/1999 |
| JP | (P) HEI 11-99934 | 4/1999 |
| JP | (P) 2000-33861 | 2/2000 |
| JP | (P) 2000-33862 | 2/2000 |
| WO | WO 92/21542 A | 12/1992 |

* cited by examiner

Primary Examiner—Matthew C. Graham
(74) Attorney, Agent, or Firm—Kenyon & Kenyon

(57) ABSTRACT

A pair of shoes are expanded by driving an electric brake motor. Due to the friction engagement of the shoes with a drum inner peripheral surface, a braking force is applied to a wheel. An actual braking torque is detected by a strain sensor that detects the load applied to an anchor pin. Through a feedback control using the actual braking torque, the electric motor is driven and controlled so that the actual braking torque becomes equal to a target braking torque that is determined in accordance with the amount of operation of a brake pedal. When the actual braking torque is undetectable, for example, during a stop of a vehicle, the electric motor is driven and controlled through an actuating force control using the current through the electric motor that is detected by a motor current sensor. The braking torque control apparatus controls the actual braking torque to a magnitude corresponding to brake operation, regardless of the magnitude of the coefficient of friction between a friction engagement member and brake rotor. Even when the braking torque is undetectable, the apparatus executes brake control in a good manner.

24 Claims, 11 Drawing Sheets

BRAKING TORQUE CONTROL APPARATUS AND METHOD

INCORPORATION BY REFERENCE

The disclosures of Japanese Patent Application Nos. HEI 11-311010 filed on Nov. 11, 1999 and 2000-259842 filed on Aug. 29, 2000 each including the specification, drawings and abstract are incorporated herein by reference in their entirety.

BACKGROUND OF THE INVENTION

1. Field of the Invention

The invention relates to braking torque control apparatus and method for controlling the braking toque of a brake.

2. Description of the Related Art

Japanese Patent Application No.11-43041 describes an electrically driven brake that controls the rotation of a wheel by driving an electric motor to press a friction engagement member against a brake rotor that rotates together with the wheel and thus achieving friction engagement therebetween. The patent application also describes a braking torque control apparatus for controlling the braking torque applied to the wheel by controlling the current supplied to the motor of the electrically driven brake. The braking torque control apparatus determines a target braking torque based on an amount of braking operation provided by a driving person. Based on the thus-determined target braking torque and a pre-stored relationship between the current supplied to the electric motor and the braking torque, the braking torque control apparatus determines a current to be supplied to the motor. Then, the control apparatus supplies the thus-determined current to the motor. As for the relationship between the supplied current and the braking torque, a plurality of relationships in accordance with coefficients $\mu$ of friction between the friction engagement member and the brake rotor of the electric brake are pre-stored. A friction coefficient $\mu$ is estimated based on an actual current supplied to the motor and the actual braking torque. In accordance with the estimated friction coefficient $\mu$, one of the relationships is determined. In accordance with the thus-determined relationship, a current to be supplied is determined. Thus, this braking torque control apparatus is able to control the actual braking torque to a magnitude corresponding to the brake operation.

SUMMARY OF THE INVENTION

A first object of the invention is to ensure that a braking torque control apparatus will provide braking torque corresponding to brake operation, regardless of the magnitude of the coefficient $\mu$ of friction between a brake rotor and a friction engagement member. A second object is to allow good performance of brake control in a braking torque control apparatus that feeds back the actual braking torque in order to provide braking torque corresponding to brake operation, even when the braking torque is undetectable at all or cannot be detected with good precision.

In order to achieve aforementioned and other objects, a braking torque control apparatus in accordance with a first aspect of the invention includes a target braking torque determiner that determines a target braking torque based on an amount of brake operation performed by a driving person, an actual braking torque detector that detects an actual braking torque applied to the wheel, and a braking torque-corresponding brake control portion that controls the brake so that the actual braking torque detected by the actual braking torque detector approaches the target braking torque determined by the target braking torque determiner.

In this braking torque control apparatus, the actual braking torque applied to the wheel is detected, and the brake is controlled so that the actual braking torque approaches the target braking torque. Therefore, braking torque can be provided corresponding to brake operation, regardless of the magnitude of the coefficient $\mu$ of friction between the brake rotor and the friction engagement member.

The brake described herein is, for example, an electric brake that includes an electric actuator such as an electric motor or the like. In the electric brake, the brake is actuated by the electric actuator pressing the friction engagement member against the brake rotor. The pressing force is controlled by controlling the electric energy supplied to the electric actuator. The brake may also be a hydraulic brake that includes (1) a wheel cylinder, and (2) an electromagnetic control valve device capable of electrically controlling the hydraulic pressure on the wheel cylinder. In the hydraulic brake, the wheel cylinder hydraulic pressure is controlled by control of the electromagnetic control valve device. The electromagnetic control valve device and the wheel cylinder form an electric control actuator. The brake may be a disc brake, a drum brake, etc.

The brake may be a drum brake. The drum brake may include a brake drum that rotates together with the wheel, a pair of shoes disposed inside the brake drum, the shoes being retained to an unrotatable backing plate by an anchor so that the shoes are prevented from rotating together with the break drum, and an actuator that brings an outer peripheral surface of each shoe into a friction engagement with an inner peripheral surface of the brake drum by moving the shoes away from each other. In the drum brake, the actual braking torque detector detects the actual braking torque applied to the wheel, based on a force acting on the anchor.

When the two shoes of the drum brake are expanded or moved away from each other, the outer peripheral surfaces of the shoes come into friction engagement with the inner peripheral surface of the brake drum, so that friction occurs therebetween. This friction force is the braking force. Due to this braking force, rotation of the brake drum is restrained. Furthermore, a force corresponding to the braking force acts on the anchor. Therefore, by detecting the force acting on the anchor and multiplying the detected value by a dimensional value specific to the brake construction, a braking torque can be determined.

The braking force increases with increases in the coefficient $\mu$ of friction between the outer peripheral surfaces of the shoes and the inner peripheral surface of the brake drum if the force expanding the two shoes (which is the actuating force of the drum brake) remains unchanged, that is, if the contact surface pressure between the outer, peripheral surfaces of the shoes and the inner peripheral surface of the brake drum remains unchanged. In the drum brake in particular, the braking force is more likely to be affected by the friction coefficient than in the disc brake, due to the servo effect that the friction force acting on the brake shoes of the drum brake increases the contact surface pressure between the brake shoes and the brake drum. The braking force, that is, the braking torque, varies to a considerably great extent even if it is provided by a fixed amount of brake operation. Therefore, if the braking torque-corresponding brake control is performed on the drum brake, the actual braking torque can be provided in good correspondence to the brake operation (target braking torque), regardless of the magnitude of the friction coefficient.

The brake may also be a duo-servo type drum brake. The duo-servo type drum brake includes a brake drum that rotates together with the wheel, a pair of shoes disposed inside the brake drum, the shoes being retained to a backing plate in such a manner that first end portions of the shoes that face each other are engaged with an anchor and the shoes are prevented from rotating together with the brake drum, a strut provided so that the strut interconnects second end portions of the shoes so as to transmit a force acting on one of the shoes to another one of the shoes, and an actuator that brings an outer peripheral surface of each shoe into a friction engagement with an inner peripheral surface of the brake drum by moving the first end portions of the shoes away from each other. In the duo-servo type drum brake, the actual braking torque detector detects the actual braking torque applied to the wheel, based on a force acting on at least one of the anchor and the strut.

If the first end portions of the shoes are expanded or moved away from each other, the outer peripheral surfaces of the shoes come into friction engagement with the inner peripheral surface of the brake drum, so that friction force occurs therebetween. The drag force based on the friction produced on one of the shoes and the expansion force caused by the actuator are transmitted from the second end portion of that shoe to the second end portion of the other shoe via the strut. Therefore, the second shoe is pressed against the drum by the sum of the drag force and the expansion force, so that a greater friction occurs on the second shoe than on the first shoe. The force applied from a first one of the shoes to the strut becomes an output that is increased, by the servo effect of the first shoe, from the expansion force applied to the first end portion of the first shoe. The force applied from the second shoe to the anchor becomes an output further increased from the output of the first shoe by the servo effect of the second shoe. Therefore, based on the force acting on the anchor, the braking torque of the entire duo-servo type drum brake can be detected. However, the braking torque determined based on the force acting on the strut merely includes the braking torque produced by one of the shoes, and does not include the braking torque produced by the other shoe. Therefore, the braking torque produced by the other shoe needs to be taken into consideration in order to determine the braking torque of the entire duo-servo type brake drum.

Thus, among the drum brakes, a duo-servo type drum brake receives a particularly great effect of the friction coefficient $\mu$ on the braking torque since the output from one of the two shoes of the duo-servo type drum brake becomes an input to the other shoe so that a double servo effect is achieved. Therefore, it is particularly effective to apply the invention to the duo-servo type drum brake so that the braking torque corresponding to brake operation can be provided regardless of the magnitude of the friction coefficient $\mu$.

The actuator may be an electric actuator that is actuated upon supply of an electric energy. The electric actuator includes, for example, an electric motor. Through control of the electric energy supplied to the electric motor, it is possible to directly control the force for expanding the two shoes, that is, the brake actuating force.

The braking torque control apparatus in accordance with the first aspect of the invention may further include a target actuating force determiner that determines a target actuating force of the brake based on the amount of brake operation, an actual actuating force detector that detects an actual operating force of the brake, an actuating force-corresponding brake control portion that controls the brake so that the actual actuating force detected by the actual actuating force detector approaches the target actuating force determined by the target actuating force determiner, and a selecting portion that selects one of the actuating force-corresponding brake control portion and the braking torque-corresponding brake control portion based on a state of a vehicle.

The braking torque control apparatus in accordance with the first aspect of the invention includes an electric actuator that generates an actuating force in accordance with a current supplied, and an electric brake that is driven by the electric actuator to apply the braking torque to the wheel. The apparatus controls the braking torque applied to the wheel by controlling the electric actuator. The braking torque control apparatus may further include an amount-of-brake-operation detector that detects an amount of brake operation performed by a driving person, an actual braking torque detector that detects an actual braking torque applied to the wheel, a braking torque-corresponding brake control portion that determines a target braking torque based on the amount of brake operation detected, and that feeds back the actual braking torque detected, and that controls a current flowing through the electric actuator so that the actual braking torque detected becomes equal to the target braking torque determined, an actuating force-corresponding brake control portion that determines a target value of current based on the amount of brake operation detected, and that performs a control such that a current equal to the target value of current determined is caused to flow to the electric actuator, and a selecting portion that selects one of the actuating force-corresponding brake control portion and the braking torque-corresponding brake control portion, based on a state of a vehicle in which the braking torque control apparatus is installed.

According to this construction, if the braking torque-corresponding brake control portion is selected, the brake is controlled by the braking torque-corresponding brake control portion. If the actuating force-corresponding brake control portion is selected, the brake is controlled by the actuating force-corresponding brake control portion. The selection of one of the braking torque-corresponding brake control portion and the actuating force-corresponding brake control portion is made based on a state of the vehicle.

The selecting portion switches from the control by the braking torque-corresponding brake control portion to the control by the actuating force-corresponding brake control portion when a state where the actual braking torque is substantially undetectable by the actual braking torque detector is established.

If the control of bringing the actual braking torque toward the target braking torque is performed when the actual braking torque is substantially undetectable, that is, when the actual braking torque cannot be detected with good precision, there is a danger of the brake actuating force becoming excessively great. In contrast, if the actual brake actuating force is controlled so as to approach the target actuating force when the actual braking torque is substantially undetectable, the danger of the actuating force becoming excessively great can be avoided.

The state where the actual braking ,torque is substantially undetectable by the braking torque detector may be detected based on a quantity of decelerating state that indicates a decelerating state of the vehicle, for example, the vehicle body speed, the wheel speed, the braking torque, a differential of any one of the vehicle body speed, the wheel speed, and the braking torque, etc.

A time when the state where the actual braking torque is substantially undetectable by the actual braking torque detector is established may be a time when one of a wheel speed and a vehicle body speed becomes equal to or lower than a set speed.

When the vehicle body speed or the wheel speed is at most the set speed, the actual braking torque becomes so small that the actual actuating force cannot be detected with good precision. The aforementioned set speed may be set to such a magnitude that the vehicle can be considered stopped. In this case, the vehicle body speed may be calculated from the speeds of the wheels, the rotational speed of the output shaft of the transmission, etc. In a vehicle equipped with an ABS (anti-lock brake system), the vehicle body speed may be a vehicle speed estimated by the ABS. The wheel speed is calculated from the rotational speed of the wheel. When the wheel speed (or vehicle speed) is near 0 km/h, the intervals between pulses generated in accordance with the rotation of the wheel become large, so that the precision in detecting the wheel speed becomes low. Therefore, it may be advisable that when the wheel speed is equal to or less than a predetermined low speed (e.g., 5 km/h), a substantially stopped state be considered established, and the control be switched from the control by the braking torque-corresponding brake control portion to the control by the actuating force-corresponding brake control portion. It is to be noted that if the detection precision of the wheel speed (or vehicle speed) is high when the wheel speed is near 0 km/h, the predetermined low speed can be set to a value that is very close to "0".

Furthermore, the time when the state where the actual braking torque is substantially undetectable by the actual braking torque detector is established may be a time when the wheel becomes a locked state.

The actual braking torque cannot be detected with good precision when the wheel is in the locked, as is the case when the wheel speed is at most the set speed. The locked state substantially the same as the slipping state of the wheel. Therefore, the aforementioned locked state may be replaced with the slipping state.

Furthermore, the time when the state where the actual braking torque is substantially undetectable by the actual braking torque detector is established may be a time when a deviation between the target braking torque determined and the actual braking torque detected by the actual braking torque detector becomes equal to or greater than a predetermined value.

Immediately before the wheel sped becomes "0", the actual braking torque detected by the actual braking torque detector sharply decreases whereas the determined target braking torque remains large. Therefore, the deviation between the actual and target braking torques can be used as a basis for detecting that the wheel speed has become substantially "0". In this case, the actual braking torque cannot be detected with good precision, as in the case where the wheel speed is at most the set speed. Furthermore, if besides the condition that the deviation between the actual and target braking torques is at least a predetermined value, a new condition that the aforementioned condition continues for at least a predetermined time is added, the state where the actual braking torque is undetectable can be more reliably detected.

Furthermore, in addition to or instead of the condition that the deviation between the actual and target braking torques is at least the predetermined value, a condition that the decreasing rate of the actual braking torque detected by the actual braking torque detector is at most a predetermined negative value may be used to detect the state where the actual braking torque is undetectable.

Still further, the time when the state where the actual braking torque is substantially undetectable by the actual braking torque detector is established may be a time when the actual braking torque detected by the actual braking torque detector starts to oscillate.

When the vehicle is stopped due to braking torque, the actual braking torque detected by the actual braking torque detector starts to oscillate due to backlash. Therefore, based on oscillation of the detected actual braking torque, too, it is possible to detect that the wheel speed has become substantially equal to "0". In this case, too, the actual braking torque is undetectable with good precision, as in the case where the wheel speed is equal to or less than the set speed. As for the detection of oscillation of the actual braking torque, detection of oscillation of the value detected by a braking torque sensor about a reference value (e.g., "0") may be sufficient. The reliability of the detection can be enhanced by counting the number of times of the detected value passing the reference value and detecting the state where the actual braking torque is undetectable when the counted number of times reaches or exceeds a predetermined number.

Still further, the time when the state where the actual braking torque is substantially undetectable by the actual braking torque detector is established may be a time when the actual braking torque detected by the actual braking torque detector becomes equal to or less than a predetermined value.

Immediately before the wheel speed becomes "0", the actual braking torque detected by the actual braking torque detector sharply decreases as mentioned above. Therefore, based on the detected actual braking torque being equal to or less than the preset value, it is also possible to detect that the wheel speed has become substantially equal to "0". In this case, too, detection of the actual braking torque with good precision is impossible, as in the case where the wheel speed is at most the set speed. If besides the condition that the actual braking torque detected by the actual braking torque detector is at most the predetermined value, a condition that the deviation between the detected actual braking torque and the determined target braking torque is at least a predetermined value is added, the precision in detecting the state where the actual braking torque is undetectable by the actual braking torque detector increases.

The time when the state where the actual braking torque is substantially undetectable by the actual braking torque detector is established may be a time when a fore-to-aft acceleration detected by a fore-to-aft acceleration sensor installed in the vehicle becomes equal to or less than a predetermined value. As the predetermined value, a very small value close to "0" is adopted. In this manner, too, it is possible to detect that the wheel speed has become substantially equal to "0". In this case, too, the actual braking torque is undetectable with good precision, as in the case where the wheel speed is at most the set value.

The fore-to-aft acceleration detected by the fore-to-aft acceleration sensor oscillates due to backlash at the time of a stop of the vehicle. Therefore, as in the case of the braking torque, it may be advisable to detect the state where the actual braking torque is undetectable, based on oscillation of the fore-to-aft acceleration. The number of oscillations of the detected fore-to-aft acceleration may also be added as a condition for the detection.

Furthermore, the aforementioned conditions may be suitably combined to detect the state where the actual braking torque is undetectable, that is, a state where the wheel has become substantially equal to "0".

The selecting portion may select the braking torque-corresponding brake control portion when the actuating force of the brake is not excessively great relative to the coefficient of friction between the tire and a road surface.

Furthermore, the selecting portion may select the braking torque-corresponding brake control portion when the slip state of the wheel is better than a preset state.

The friction occurring between the tire and a road surface increases with increases in the brake actuating force if the friction is within a range whose maximum is a friction that corresponds to the maximum friction coefficient between the tire and the road surface. That is, this range is a range where the braking torque increases with increases in the brake actuating force. If the braking torque-corresponding brake control is performed when the friction is within this range, the actual braking torque can be brought close to the target braking torque.

After the friction on the road surface reaches the friction corresponding to the maximum friction coefficient of the road surface, the friction does not increase any further. Therefore, if in that case, the brake actuating force is increased, the friction does not increase, but decrease. If in this state, the braking torque-corresponding brake control is performed so that the brake actuating force is increased due to the actual braking torque being insufficient for the target braking torque, the wheel locking tendency becomes stronger and the braking torque becomes smaller.

During a state where the friction on the road surface is greater than the magnitude corresponding to the maximum friction coefficient, it is desirable that the anti-lock control be performed. In the anti-lock control, the brake actuating force is controlled so that the slip state of the wheel is kept in an appropriate state. As a result, a substantially maximum braking torque can be obtained. However, if an anti-lock control apparatus is not provided, or if although an anti-lock control apparatus is provided, the anti-lock control cannot be performed for any reason, it is desirable that the actuating force-corresponding brake control be performed. If the actuating force-corresponding brake control is performed, inappropriate performance of the braking torque-corresponding brake control as mentioned above is avoided.

The selecting portion may select the actuating force-corresponding brake control portion if the slip state of the wheel is worse than a set state and the vehicle running speed is less than an anti-lock control-prohibiting speed.

If the slip state is worse than the set state, it is desirable that the anti-lock control be performed. However, if the vehicle running speed is less than the anti-lock control-prohibiting speed, the anti-lock control is not performed. In this case, it is desirable that the actuating force-corresponding brake control, not the braking torque-corresponding brake control, be performed.

It is also possible to perform the actuating force-corresponding brake control when the anti-lock control ends due to the slip state being better than the set state and the vehicle running speed being less than the anti-lock control-prohibiting speed. According to the braking torque control apparatus that detects that the state where the actual braking torque is undetectable by the actual braking torque detector is established, on condition that the wheel speed is at most a predetermined set speed, the braking torque-corresponding brake control is supposed to be performed if the wheel rotational speed is at least the set speed when the anti-lock control is ended due to a reduction in the slip of the wheel and the vehicle running speed decreasing below the anti-lock control-prohibiting speed. However, when the running speed is less than the anti-lock control-prohibiting speed, it is highly likely that the vehicle will be stopped within a short time. As the wheel rotational speed decreases to or below the set speed, the actuating force-corresponding brake control is performed. Thus, the control is switched in the order of the anti-lock control, the braking torque-corresponding brake control, and the actuating force-corresponding brake control, within a short time, which is not desirable. Therefore, if a design is made such that the actuating force-corresponding brake control is performed when the anti-lock control is ended as the aforementioned conditions are met, the switching of the mode of the brake control within a short time can be avoided.

At a time of switching from a control performed by the braking torque-corresponding brake control portion to a control performed by the actuating force-corresponding brake control portion, the selecting portion may gradually perform the switching.

Therefore, even if at the time of the control by the braking torque-corresponding brake control portion to the control by the actuating force-corresponding brake control portion, there is a difference between the braking torques caused by the controls of the two control portions, the braking torque actually applied to the wheel is gradually changed, so that a driving person will receive no uncomfortable feeling.

In this case, the control gain of the braking torque achieved by the braking torque-corresponding brake control portion may be gradually decreased and the control gain of the braking torque achieved by the actuating force-corresponding brake control portion may be gradually increased, as time elapses after the actual braking torque becomes substantially undetectable. Gradual decreases in the control gain of the braking torque by the braking torque-corresponding brake control portion and gradual increases in the control gain of the braking torque by the actuating force-corresponding brake control portion may also be caused with increases in the deviation between the determined target braking torque and the actual braking torque detected by the actual braking torque detector, instead of the elapse of time.

The brake may include a disc brake that is provided for a front wheel and that brings a friction engagement member into friction engagement with a disc rotor that rotates together with the front wheel, and a drum brake that is provided for a rear wheel and that brings a friction engagement member into friction engagement with an inner peripheral surface of a brake drum that rotates together with the rear wheel. In this case, the braking torque control apparatus prohibits control of the drum brake of the rear wheel by the braking torque-corresponding brake control portion if the anti-lock control is performed on at least one of the front and rear wheels.

As mentioned above, performance of the control by the braking torque-corresponding brake control portion is not desirable when the anti-lock control is being executed.

Furthermore, the braking torque control apparatus may prohibit actuation of the drum brake of the rear wheel when the vehicle running speed is at most the anti-lock control-prohibiting speed.

When the vehicle running speed is less than the anti-lock control-prohibiting speed, great braking torque is unnecessary in most cases. During a state where the anti-lock control is performed (a state where the wheel rotational speed is low), the braking torque-corresponding brake control cannot be performed with good precision. Furthermore, the rear wheel brake produces smaller braking torque than the front wheel brake.

Thus, if the braking torque cannot be controlled with good precision when large braking torque is not needed, it is desirable in some cases that actuation of the rear brake be prohibited.

Aspects of the invention are not limited to the braking torque control apparatus described above. Other aspects of the invention are, for example, a vehicle equipped with a braking torque control apparatus, and a control method for a braking torque control apparatus.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

A braking torque control apparatus according to an embodiment of the invention will be described in detail hereinafter with reference to the accompanying drawings.

Figure 1:
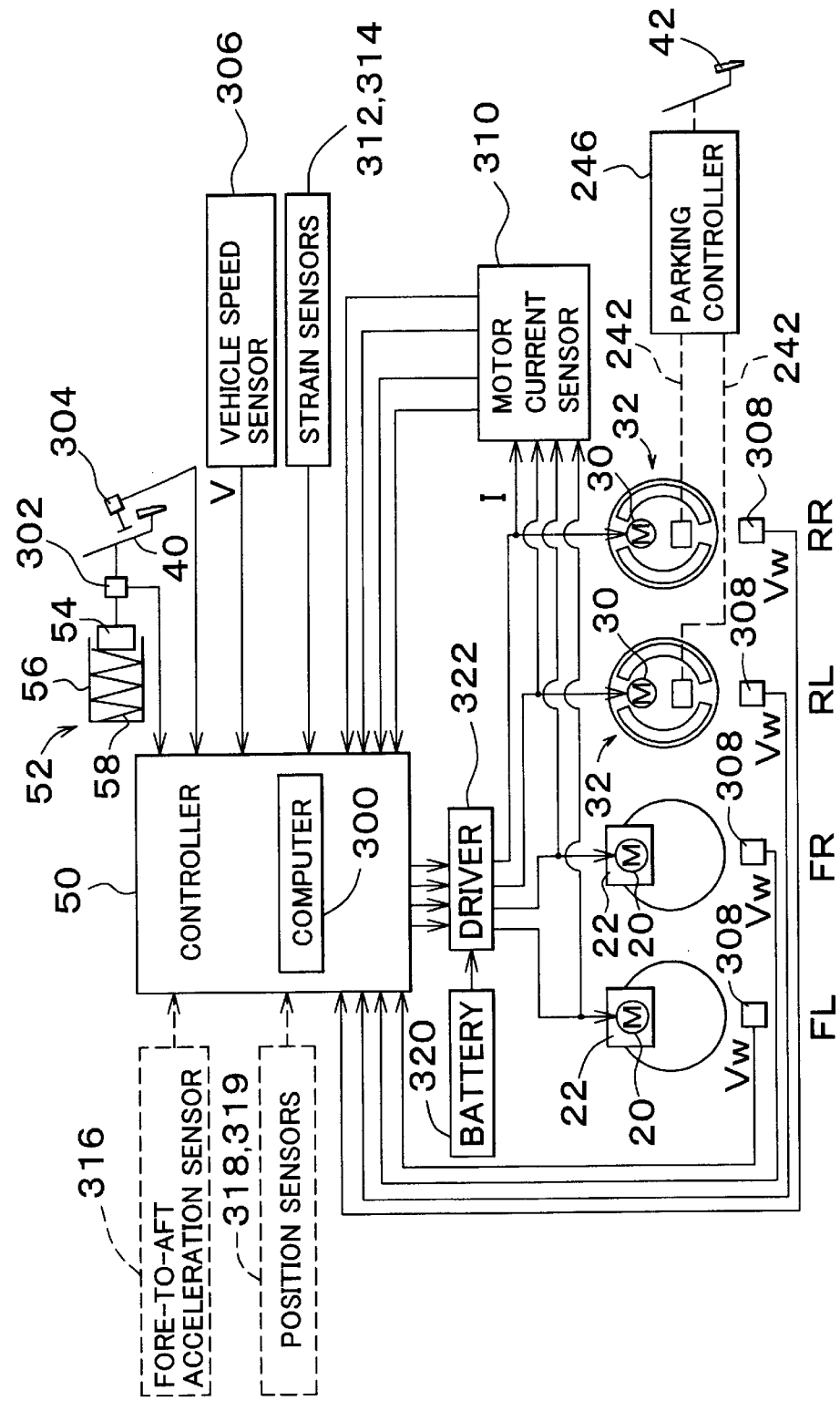
FIG. 1 is a system diagram showing an overall construction of an electric brake apparatus that includes a braking torque control apparatus according to an embodiment of the invention.

FIG. 1 illustrates an overall construction of an electric brake apparatus that includes the braking torque control apparatus. The electric brake apparatus includes electric disc brakes 22 provided for right and left front wheels FR, FL, and electric drum brakes 32 provided for right and left rear wheels RR, RL. Each electric disc brake 22 and each electric drum brake 32 include an electric motor 20 and an electric motor 30, respectively. In this embodiment, the electric motors 20, 30 are DC motors. However, various other motor arrangements may also be adopted, for example, an arrangement in which all the brake motors are ultrasonic motors, an arrangement in which the front-wheel brake motors are ultrasonic motors and the rear-wheel brake motors are DC motors, an arrangement in which the front-wheel brake motors are DC motors and the rear-wheel brake motors are ultrasonic motors, and so on.

The electric brake apparatus is provided with a brake pedal 40 as a brake operating member for the service brake purpose, and with a parking pedal 42 as a brake operating member for the parking brake purpose. When the brake pedal 40 is operated, the electric brakes 22, 32 of the four wheels are operated by drive forces from the electric motors 20, 30. The electric motors 20, 30 are controlled by a controller 50. When the parking pedal 42 is operated, the electric drum brakes 32 of the right and left rear wheels RR, RL are operated.

A stroke simulator 52 is connected to the brake pedal 40. The stroke simulator 52 includes a moving member 54 that moves in association with the brake pedal 40, a guide 56 that guides the moving member 54, and a spring 58 provided as an elastic member whose elastic force is increased or decreased as the spring is expanded or compressed in accordance with the movements of the moving member 54. The stroke simulator 52 is designed so as to provide an operation stroke corresponding to the operating force on the brake pedal 40.

The electric disc brakes 22 for the right and left front wheels FR, FL, although not illustrated in the drawings, control the rotation of the wheels by operating the electric motors 20 so as to bring brake pads that are provided as friction engagement members retained in a rotation impossible fashion to mounting brackets that are vehicle body-side members into friction engagement with disc rotors that rotate together with the wheels.

Figure 2:
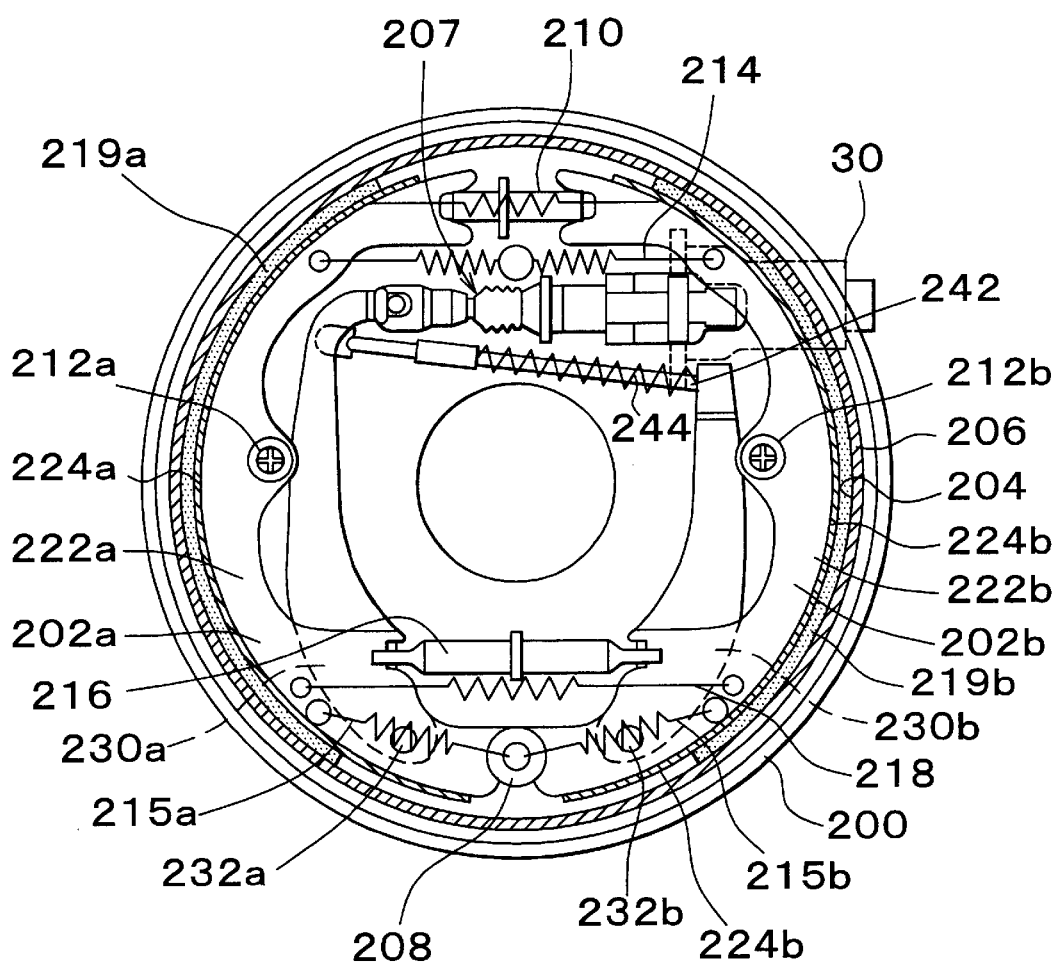
FIG. 2 is a sectional view showing an electric drum brake included in the electric brake apparatus.

The electric drum brakes 32 of the right and left rear wheels RR, RL are of a duo-servo type as shown in FIG. 2. Each electric drum brake 32 includes a generally circular backing plate 200, a pair of generally arc-shaped brake shoes 202a, 202b provided on the backing plate 200, a drum 206 that has on its inner peripheral face a friction surface 2 and that rotates together with the wheel, and an electric actuator 207 that moves end portions of the shoes 202a, 202b away from each other. The backing plate 200 is connected to a vehicle body-side member (not shown) in such a manner that the backing plate 200 is prevented from rotating.

First end portions of the brake shoes 202a, 202b that face each other are engaged with an anchor pin 208, fixed to the backing plate 200 so that the shoes 202a, 202b are retained pivotably but are prevented from turning together with the drum 206. Second end portions of the shoes 202a, 202b are interconnected by a strut 210. The strut 210 transmits force acting on one of the shoes to the other shoe. The brake shoes 202a, 202b can be slid along the surfaces of the backing plate 200 by shoe hold-down devices 212a, 212b, respectively.

The second end portions of the two brake shoes 202a, 202b are urged by a spring 214 in such directions as to move closer to each other. The first end portions of the shoes 202a, 202b are urged by shoe return springs 215a, 215b, respectively, toward the anchor pin 208. A strut 216 and a return spring 218 are also provided on the first end portions of the shoes 202a, 202b.

Braking linings 219a, 219b, that is, friction engagement members, are retained on outer peripheral surfaces of the brake shoes 202a, 202b. The two brake linings 219a, 219b are brought into friction engagement with an inner peripheral surface 204 of the drum 206 so that friction force is produced between the brake linings 219a, 219b and the drum 206. In this embodiment, the strut 210 has an adjust mechanism that adjusts the clearance between the drum inner peripheral surface 204 and the brake linings 219a, 219b in accordance with the abrasion of the brake linings 219a, 219b.

The brake shoes 202a, 202b include rims 224a, 224b and webs 222a, 222b, respectively. Levers 230a, 230b are pivotably connected at their first end portions to the webs 222a, 222b, via pins 232a, 232b, respectively. Portions of the levers 230a, 230b and the webs 222a, 222b that face each other have cutouts where opposite ends of the strut 216 are engaged with the levers 230a, 230b and the webs 222a, 222b.

The electric actuator 207, including the electric motor 30, is connected to a second end portion of the lever 230a. An end of a parking brake cable 242 is connected to a second end portion of the lever 230b. When the brake pedal 40 for the service brake purpose is operated, the lever 230a is turned by driving the electric motor 30 (electric actuator 207) so that the brake shoes 202a, 202b are expanded or moved away from each other by the strut 216. When the parking pedal 42 is operated, the lever 230b is turned so that the two brake shoes 202a, 202b are expanded by the strut 216. A return spring 244 is disposed coaxially with the parking brake cable 242, between the second end portion of the lever 230b and the backing plate 200.

The electric actuator 207 includes a speed reducer and a motion conversion mechanism, besides the electric motor 30. Rotation of an output shaft of the electric motor 30 is reduced in speed by the speed reducer. The speed-reduced rotational motion is converted into linear motion by a ball screw mechanism. An output member of the ball screw mechanism is connected to the second end portion of the lever 230a.

The parking brake cable 242 is connected at another end thereof to a well-known parking controller 246 as shown in FIG. 1. The parking controller 246 is mechanically actuated by the operating force exerted on the parking pedal 42. Thereby, a tensile force is applied to the parking brake cable 242 such that the lever 230b is turned in such a direction as to expand the two brake shoes 202a, 202b.

In this embodiment, the parking brake is mechanically engaged via the parking brake cable 242 by operating the parking pedal 42. However, it is also possible to electrically engage the parking brake by using an electric motor to pull the parking brake cable 242 or to directly turn the lever 230b. In that case, the electric motor is actuated through operation of an operating element such as an operating switch, a dial, or the like.

Next described will be a software construction of the electric brake apparatus. As shown in FIG. 1, the controller 50 is formed mainly by a computer 300 that includes a CPU, a ROM, and a RAM. An input side of the controller 50 is connected to an operating force sensor 302, a brake pedal switch 304, a vehicle speed sensor 306, four wheel speed sensors 308, a motor current sensor 310, strain sensors 312, 314, etc.

The operating force sensor 302 detects the operating force (or amount of operation) applied to the brake pedal 40. Based on the operating force detected by the operating force sensor 302, a target brake actuating force and a target braking torque are determined. The brake pedal switch 304 is switched to one state when the brake pedal 40 is in an operated state, and the brake pedal switch 304 is switched to another state when the brake pedal 40 is in a non-operated state. The vehicle speed sensor 306 detects the vehicle speed V by detecting the rotation of an output shaft of a transmission. The Wheel speed sensors 308 are provided individually for the four wheels FR, FL, RR, RL so as to detect the wheel speeds Vw of the corresponding wheels. Based on the wheel speeds Vw of the four wheels, the slip state of each wheel is detected.

The motor current sensor 310 is connected to coils of the electric motors 20, 30 of the four electric brakes 22, 32, and detects the actual value of supplied current I (value obtained taking the duty ratio into consideration) that is actually supplied to each of the electric motors 20, 30 from a battery 320, that is, a power supply, via a driver 322. In this embodiment, based on the actual value of supplied current I, an actual brake actuating force is detected. The strain sensors 312 are attached to mounting brackets (not shown) of the electric disc brakes 22. The strain sensors 314 are attached to the anchor pins 208 of the electric drum brakes 32. Based on the strains detected by the strain sensors 312, 314, an actual braking torque, that is, a braking torque that is actually produced by each electric brake 22, 32, is detected.

In this embodiment, position sensors 318, 319 may be provided in the electric brakes 22, 32, for example, as indicated by broken lines in FIG. 1. The position sensor 318 detects the position of the brake pad of each electric disc brake relative to the disc rotor by, for example, detecting the rotational angle of the electric motor 20. The position sensor 319 detects the position of the brake shoes 202a, 202b of each electric drum brake relative to the drum 206 by, for example, detecting the rotational angle of the electric motor 30. The position sensors 318, 319 are used, for example, to improve the responsiveness of generation of braking torque or improve the precision in the control of applying braking force to each wheel by operating the electric motors 20 at a high speed until the brake pads contact the disc rotors and by operating the electric motors 30 at a high speed until the brake linings 219a, 219b contact the inner peripheral surfaces 204 of the drums 206. Furthermore, the position sensors 318, 319 may also be used as substitutes for sensors that are used in the braking force application control, such as the strain sensors 312, 314 and the like, when those sensors are abnormal.

An output side of the controller 50 is connected to the driver 322. When the brake pedal 40 is operated, the controller 50 supplies an instruction signal to the driver 322. In accordance with the instruction signal, the driver 322 causes current to be supplied from the battery 320 to the electric motors 20, 30. In this embodiment, an instruction signal indicating the duty ratio is outputted to the driver 322, and current is supplied to the electric motors 20, 30 in accordance with the duty ratio.

Figure 6:
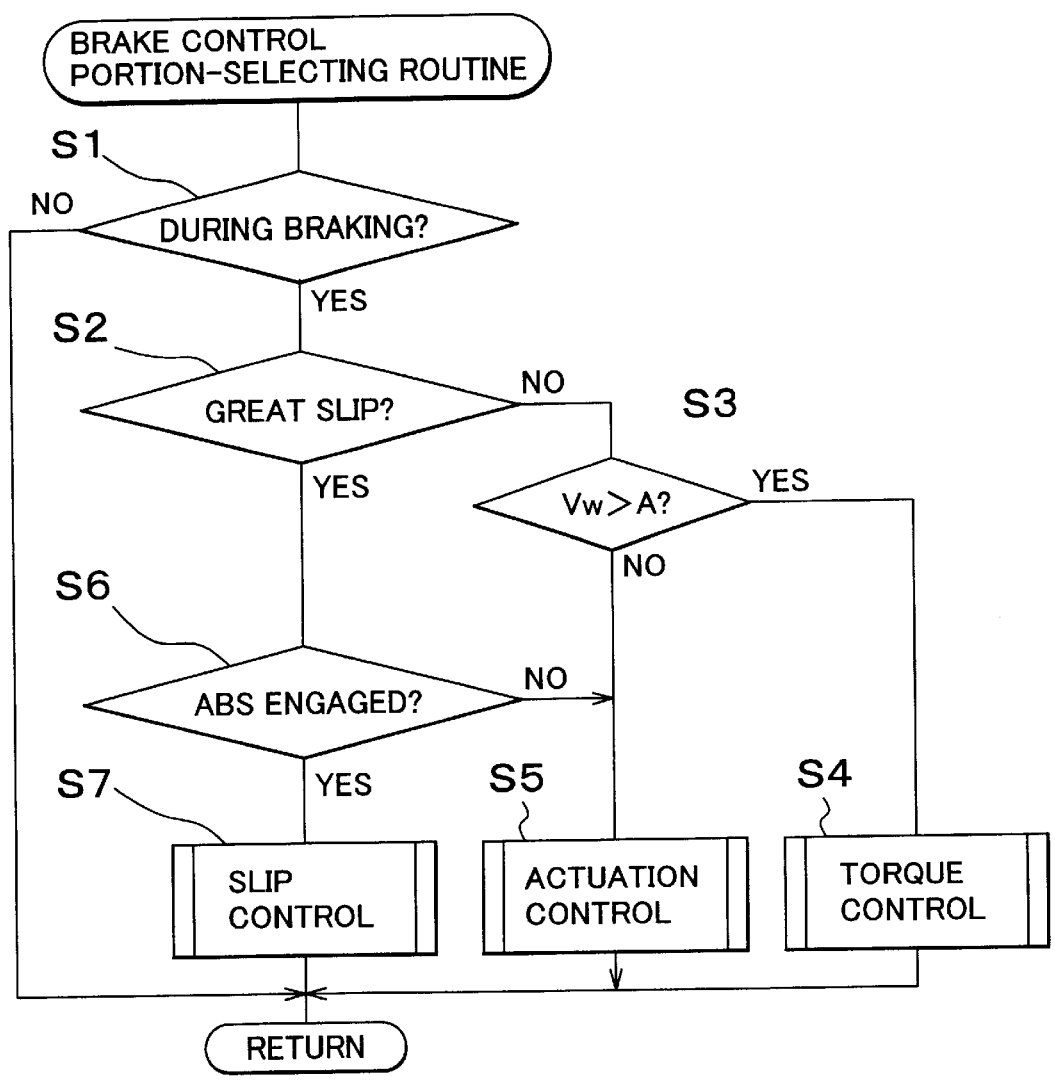
FIG. 6 is a flowchart illustrating a brake control portion-selecting routine stored in a ROM of the braking torque control apparatus.

The ROM of the computer 300 stores various tables, routines, etc., including an anti-lock control routine and a brake control portion-selecting routine illustrated in the flowchart of FIG. 6.

The operation of the electric brake apparatus will be described below. In the below description, the operation of the electric disc brakes 22 of the right and left front wheels FR, FL will not be described, but the operation of the electric drum brakes 32 of the right and left rear wheels RR, RL, which is closely related to the invention, will be described.

Figure 3:
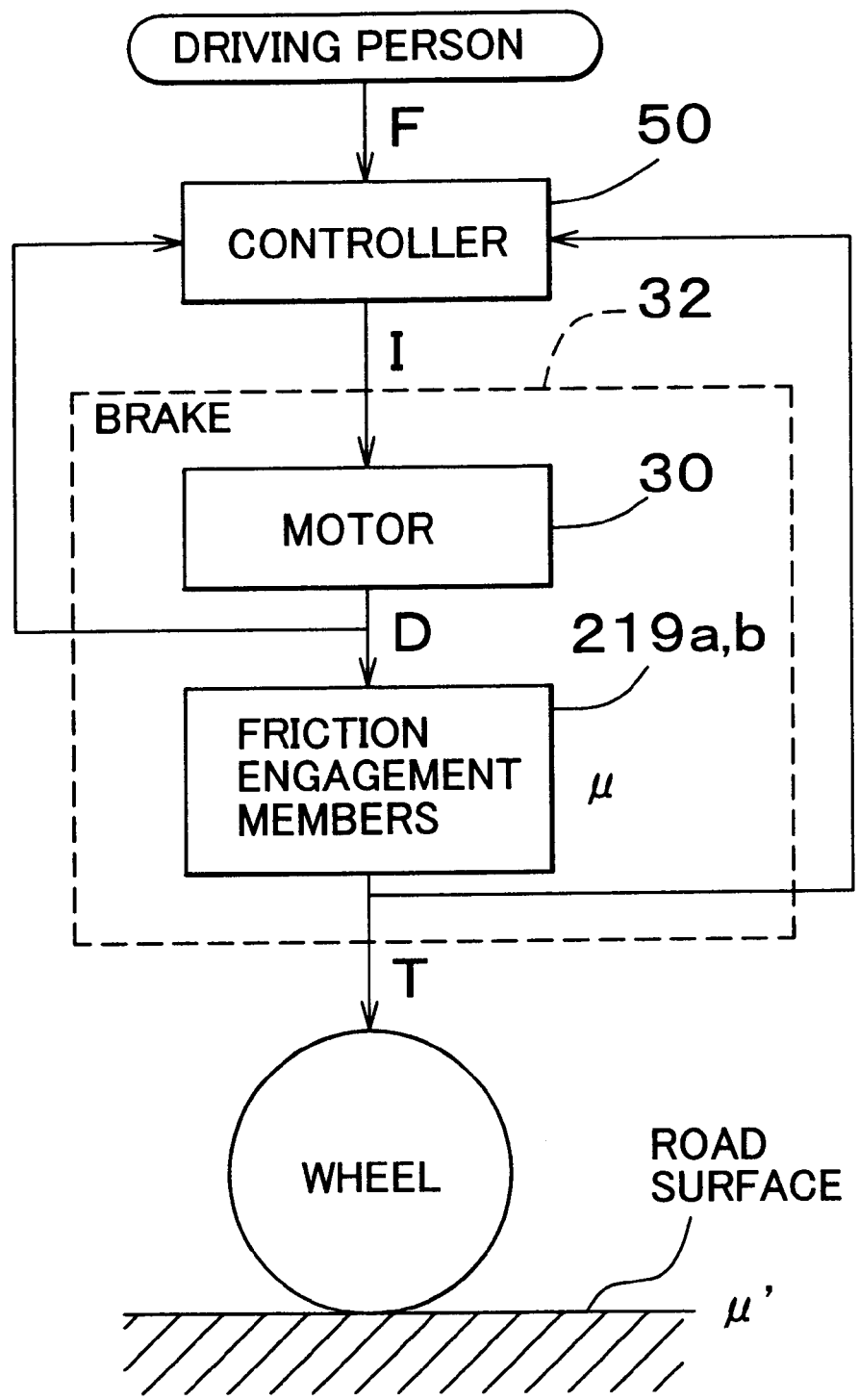
FIG. 3 is a schematic diagram illustrating a state where braking torque is applied to a wheel by the electric drum brake shown in FIG. 2.

Referring to FIG. 3, when the brake pedal 40 is operated, a current I is supplied to the electric motor 30 on the basis of an instruction from the controller 50. The electric motor 30 thus turns the lever 230a with a brake actuating force D in accordance with the supplied current I. Due to the strut 216, the two shoes 202a, 202b are expanded so that the friction engagement members (brake linings 219a, 219b) are pressed against the inner peripheral surface 204 of the drum 206. As the friction engagement members are brought into friction engagement with the drum inner peripheral surface 204, a friction force is generated therebetween. Thus, the rotation of the wheel is restrained, and a braking torque T is applied to the wheel.

The drag force based on the friction on the shoe 202b and the brake actuating force D caused by the electric actuator 207 (expansion force for expanding the two shoes 202a, 202b) are transmitted from the second end portion of the shoe 202b to the second end portion of the other shoe 202a via the strut 210. The other shoe 202a is pressed against the drum inner peripheral surface 204 by the sum of the drag force and the expansion force, so that the shoe 202a produces a friction that is greater than the friction produced by the shoe 202b. Thus, the output from one shoe 202 becomes the input to the other shoe 202b, and furthermore, a double servo effect is achieved. In this manner, the duo-servo type drum brake is able to produce great braking torques.

When the wheel rotational speed is greater than a set speed and the slip is not excessively great, a braking torque-corresponding brake control is performed. Therefore, the electric motor 30 is controlled so that the actual braking torque approaches the target braking torque.

Figure 4:
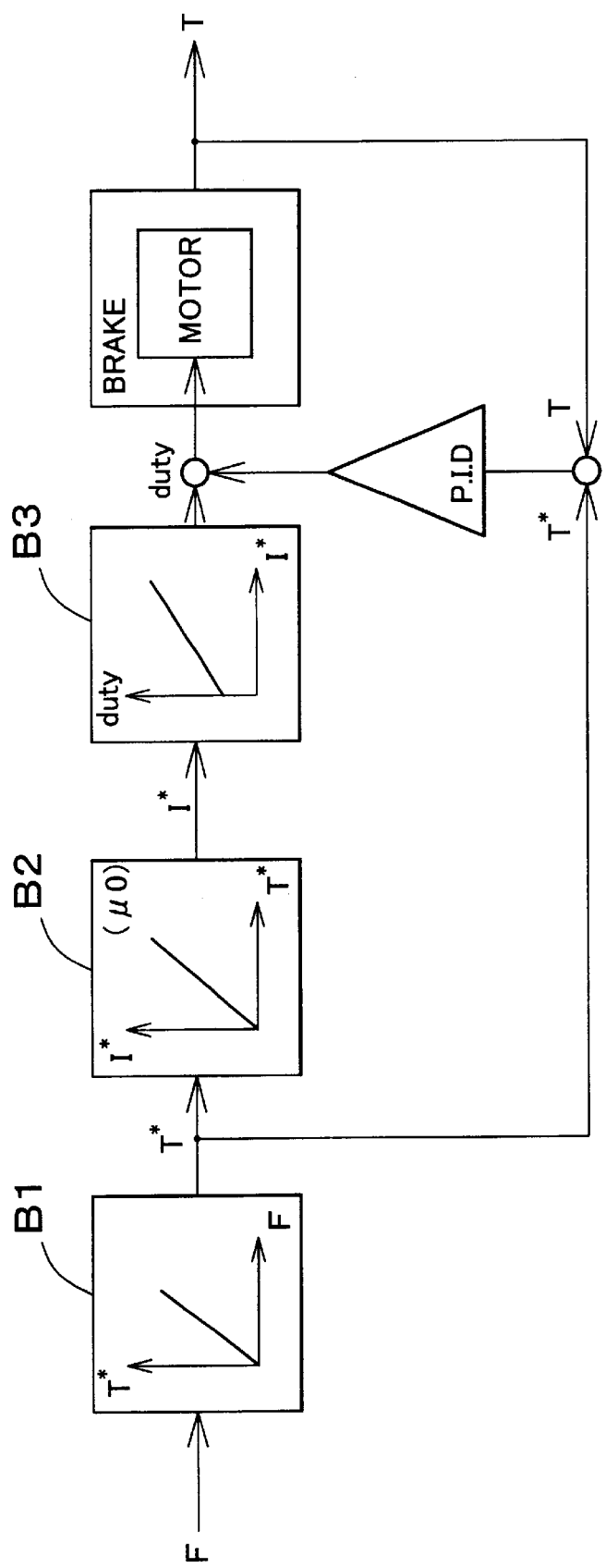
FIG. 4 is a block diagram illustrating a control performed by the braking torque control apparatus.

Referring to FIG. 4, in a block 1 (indicated by B1 in FIG. 4; other blocks are similarly indicated), a target braking torque T* is determined based on the operating force F exerted on the brake pedal 40 by the driving person. In blocks 2, 3, a value of supplied current I* is determined in accordance with a relationship between the target braking torque T* and the value of supplied current I*, and a duty ratio is determined in accordance with a relationship between the value of supplied current I* and the duty ratio. Then, an instruction signal indicating the duty ratio is outputted to the driver 322. The actual braking torque T is then fed back, and a duty ratio is determined such that the actual braking torque approaches the target braking torque T*. The duty ratio may be determined based on an actual difference between the target braking torque T* and the actual braking torque T, or a differential of the difference, or an integral of the difference. The duty ratio may also be determined based on two or more of the actual difference, the differential thereof, and the integral thereof. It is to be noted herein that a table indicating the relationship between the target braking torque T* and the value of supplied current I* (where the friction coefficient is assumed to be a basic value $\mu_0$), a table indicating the relationship between the value of supplied current I* and the duty ratio, and a table indicating the relationship between the brake operating force F and the target braking torque T* are stored in the ROM, and the aforementioned values are determined through the use of the tables. However, it is also possible to determine those values through calculations.

Figure 9:
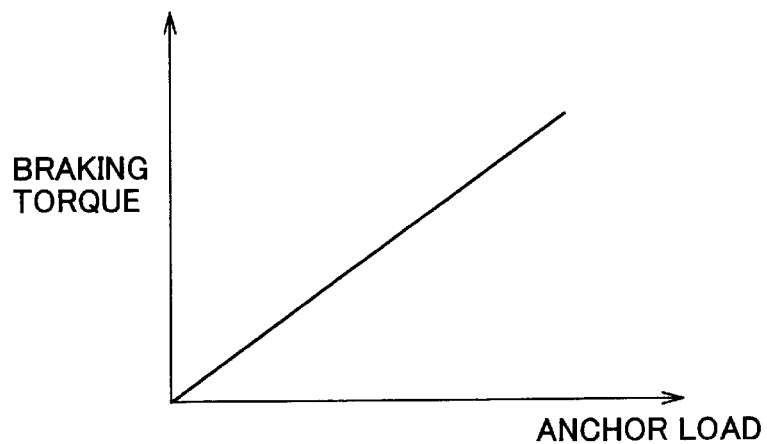
FIG. 9 is a diagram indicating a relationship between the braking torque and the load applied to an anchor pin of the electric drum brake.

The actual braking torque T is determined based on the load applied to the anchor pin 208. That is, an amount of deformation of the anchor pin 208 is detected by the strain sensor 314. In accordance with the detected amount of deformation, a load applied to the anchor pin 208 (braking force) is detected. The braking force is multiplied by a dimensional value specific to the brake construction, such as the radius of gyration or the like, to determine an actual braking torque T. The load applied to the anchor pin 208 and the braking torque always have a relationship indicated in FIG. 9.

In the duo-servo type electric drum brake 32, the drag force based on the friction produced by one of the two shoes and the expansion force caused by the electric actuator 207 are transmitted to the second end portion of the other shoe via the strut 210, so that the other shoe is pressed against the drum 206 by the sum of the drag force and the expansion force. Due to the servo effect of that other shoe, the force transmitted to the shoe via the strut 210 is further increased, and then is applied to the anchor pin 208. Therefore, by determining a braking torque based on the load applied to the anchor pin 208, an actual braking torque T produced by the duo-servo type electric drum brake 32 can be detected.

The braking torque may also be detected based on the load applied to the strut 210. In this case, however, a magnitude corresponding to the braking torque produced by one of the two shoes is detected. Therefore, it is necessary to take into consideration the braking torque produced by the other shoe in determining a braking torque produced by the electric drum brake 32.

Figure 7:
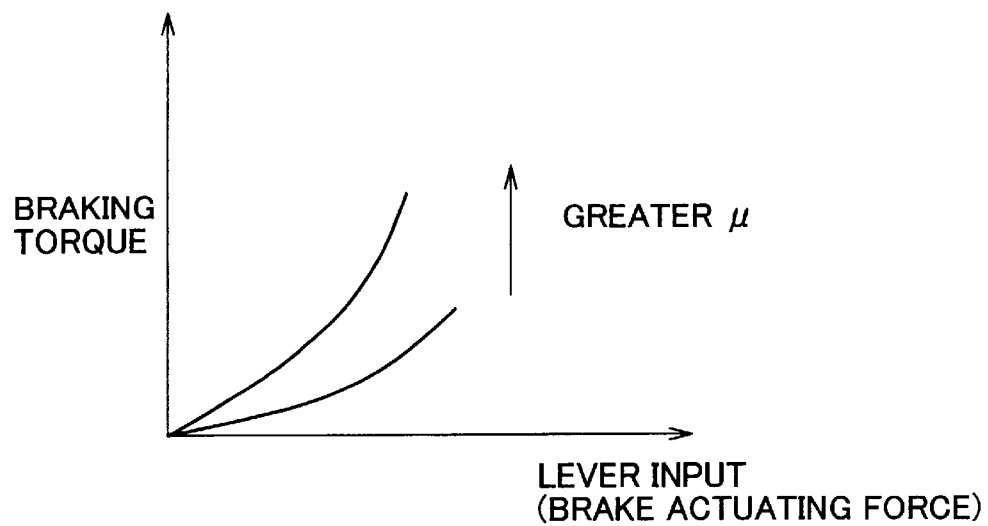
FIG. 7 is a diagram indicating a relationship between the lever input and the braking torque of the electric drum brake.
Figure 8:
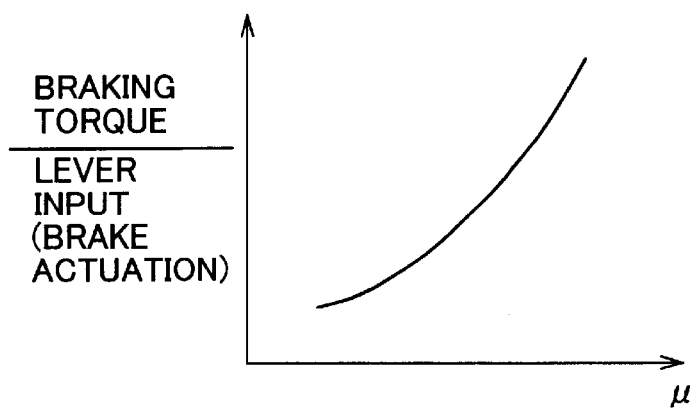
FIG. 8 is a diagram indicting a relationship between the proportion of the lever input to the braking torque and the friction coefficient $\mu$ of a friction engagement member of the electric drum brake.

The electric drum brake 32 produces braking torques by bringing the brake linings 219a, 219b into friction engagement with the inner peripheral surface 204 of the brake drum 206 as described above. If the lever input (i.e., force that turns one of the levers 230a, 230b, that is, the brake actuating force D) is fixed, the braking torque increases with increases in the coefficient $\mu$ of friction between the brake linings 219a, 219b and the drum inner peripheral surface 204, as indicated in FIG. 7. As indicated in FIG. 8, the ratio of the braking torque to the brake actuating force (value obtained by dividing the braking torque by the brake actuating force) is not constant, but varies depending on the friction coefficient.

If in the above-described case, the braking torque-corresponding brake control is performed; an actual braking torque that is in good correspondence to the brake operation (target braking torque) can be achieved regardless of the magnitude of the friction coefficient $\mu$. Thus, the braking torque-corresponding brake control is effective. Drum brakes are more likely to be affected by the friction coefficient than disc brakes because drum brakes have servo effect that the contact surface pressure between the friction engagement members and the inner peripheral surface 204 is increased by friction. Among the drum brakes, a duo-servo type drum brake receives a particularly great effect of the friction coefficient $\mu$ on the braking torque since the output from one of the two shoes of the duo-servo type drum brake becomes an input to the other shoe so that a double servo effect is achieved. Since the braking torque achieved by a fixed brake operating force varies to a great extent in the duo-servo type drum brake, the braking torque-corresponding brake control in the duo-servo type drum brake is particularly effective.

Thus, it is desirable to perform the braking torque-corresponding brake control in the duo-servo type drum brake as described above. However, in this embodiment, the braking torque-corresponding brake control is not always performed. For example, when the wheel rotational speed is less than or equal to a set speed or when the slip is excessively great (when the slip state is worse than a set state), an actuating force-corresponding brake control is performed. In the actuating force-corresponding brake control, the electric motor 30 is controlled so that the actual brake actuating force D approaches a target brake actuating force D*.

Figure 5:
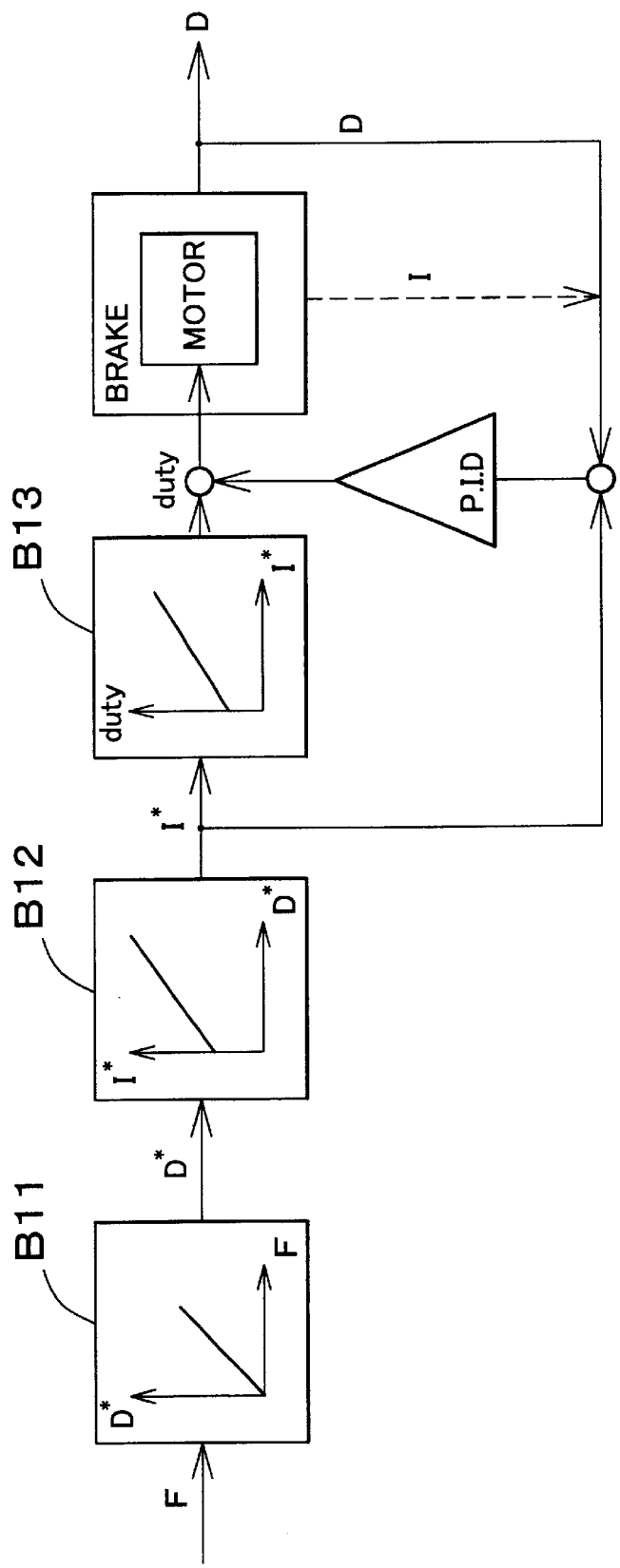
FIG. 5 is a block diagram illustrating another control performed by the braking torque control apparatus.

Referring to FIG. 5, in a block 11, a target brake actuating force D* is determined based on the brake operating force F. In a block 12, a value of supplied current I* is determined based on a relationship between the target brake actuating force D* and the value of supplied current I* (i.e., target value of current I*). In a block 13, a duty ratio is determined based on a relationship between the value of supplied current I* and the duty ratio. Then, an instruction signal indicting the determined duty ratio is outputted to the driver 322. After that, the duty ratio is determined so that the actual brake actuating force D approaches the target brake actuating force D*. A table indicating the relationship between the target brake actuating force D* and the value of supplied current I*, a table indicating the relationship between the value of supplied current I* and the duty ratio, and a table indicating the relationship between the brake operating force F and the target brake actuating force D* are pre-stored in the ROM.

When the wheel rotational speed is less than or equal to a set speed, the actual braking torque becomes very small. This is because when the rotational speed of the brake rotor is small, the friction produced between the brake rotor and the friction member pressed against the brake rotor is small. If in this case, a torque-corresponding brake control is performed, the current supplied to the electric motor 30 is increased so as to bring the actual braking torque closer to the target braking torque T*, until the supplied current reaches a maximum. Thus, performing the torque-corresponding brake control in that case is not desirable.

In this embodiment, therefore, when the wheel rotational speed is less than or equal to a set speed (e.g., about 5 km/h taking into consideration the detection assurance precision of the wheel speed sensors 308), the actuating force-corresponding brake control is performed, so that the current supplied to the electric motor 30 can be prevented from becoming excessively great. The set speed may be set to, for example, such a magnitude that the actual braking torque is very small and therefore good-precision detection is impossible. The set speed may also be set to such a magnitude that the vehicle can be considered to be in a stopped state. Furthermore, in order to prevent the supplied current from becoming excessively great, it is also possible to detect a time point when the wheel rotational speed substantially approaches "0", and to guard the value of current supplied to the electric motor 30 (the duty ratio supplied to the driver 322) by using a time function value that decreases with elapsed time after the detected time point so that current equal to or greater than the function value does not flow through the electric motor 30.

When the slip state of the wheel is worse than a set state (in this embodiment, when the slip is at least a set value), that is, when the brake actuating force D is excessively great relative to the road friction coefficient $\mu'$, the actuating force-corresponding brake control is performed.

When the brake actuating force D is not excessively great relative to the friction coefficient $\mu'$ of the road surface, that is, before the friction with the road surface reaches a magnitude corresponding to the maximum coefficient of static friction between the road surface and the tire, the road surface friction increases with increases in the brake actuating force D. If in such a case, the brake torque-corresponding brake control is performed, the actual braking torque T can be brought close to the target braking torque T*.

Conversely, when the brake actuating force D becomes excessively great relative to the friction coefficient $\mu$ of the road surface, that is, when the load surface friction reaches or exceeds a magnitude corresponding to the maximum coefficient of static friction, the deceleration of the wheel sharply increases, and the lock tendency becomes strong. If the brake actuating force is increased, the road surface friction does not increase, but the slip state worsens. In this embodiment, therefore, if the slip is greater than a set value, the actuating force-corresponding brake control is performed, so that the decrease in the braking stability can be reduced.

Furthermore, in this embodiment, if an anti-lock control start condition is met when the slip is excessively great, the anti-lock control is performed. In the anti-lock control, the supplied current is controlled so that an appropriate slip state of the wheel is maintained. As a result, the braking torque is controlled so as to become a maximum magnitude that is determined in accordance with the road surface friction coefficient.

Thus, the anti-lock control is executed when the slip is excessively great and the anti-lock control start condition is met. When the condition is not met, the actuating force-corresponding brake control is executed. That is, when the anti-lock control start condition is not met, this embodiment avoids execution of the braking torque-corresponding brake control, and thus avoids execution of an inappropriate control.

In this embodiment, the brake control portion is controlled through execution of a program illustrated by the flowchart of FIG. 6. The program is executed for each of the right and left rear wheels RR, RL.

In step 1 (hereinafter, simply referred to as "S1"; other steps will be similarly referred to), it is determined whether the brake pedal 40 is being operated based on the state of the brake pedal switch 304. In S2, it is determined whether the slip of the wheel is at least a set value. In S3, it is determined whether the wheel rotational speed is greater than a set speed.

In a case where the brake pedal 40 is being operated, and where the slip is not excessively great, and where the rotational speed is greater than the set speed, that is, when the braking state is a normal braking state, the determination in S3 becomes affirmative. Then, in S4, the torque-corresponding brake control is executed.

If the wheel rotational speed is less than or equal to the set speed, the determination in S3 becomes negative. Then, in S5, the actuating force-corresponding brake control is executed.

If the slip of the wheel is excessively great, that is, if the brake actuating force is excessively great relative to the road surface friction coefficient $\mu'$, the determination in S2 becomes affirmative. Then, in S6, it is determined whether the anti-lock control is being executed. If the anti-lock control is being executed, the slip control is subsequently executed in S7 in accordance with execution of the anti-lock control program. That is, the supplied current is controlled so as to maintain a slip state of the wheel that is appropriate with respect to the road surface friction coefficient $\mu'$. Conversely, if the anti-lock control is not being executed, the actuating force-corresponding brake control is executed in S5. Thus, if the anti-lock control is not executed despite a great slip because the vehicle running speed is at most a set speed for prohibiting the anti-lock control, this embodiment is able to avoid execution of the braking torque-corresponding brake control, which is inappropriate in the aforementioned situation.

Thus, the embodiment is able to cause the actual braking torque to approach a magnitude corresponding to the brake operation in a good manner, without a need to take into consideration the friction coefficient $\mu$ between the brake linings 219a, 219b and the drum inner peripheral surface 204. In duo-servo type drum brakes, effects of changes in the friction coefficient $\mu$ of the friction engagement members are likely to appear in the braking torque. In this embodiment, however, the braking torque T can be brought close to the target braking torque T* without a need to take the friction coefficient $\mu$ into consideration. Thus, this embodiment is effective. Furthermore, if the braking torque-corresponding brake control is executed, it is also possible to reduce the difference between the braking torques of the right and left wheels.

In this embodiment, a target braking torque determiner is formed by the operating force sensor 302, a portion of the controller 50 that executes an operation indicated in the block 1 in FIG. 4, etc. An actual braking torque detector is formed by the strain sensor 314, and the like. A braking torque-corresponding brake control portion is formed by a portion of the controller 50 that feeds the actual braking torque back and determines a duty ratio, and the like. A target actuating force determiner is formed by the operating force sensor 302, a portion of the controller 50 that executes an operation indicated in the block 11 in FIG. 5, and the like. An actual actuating force detector is formed by the current sensor 310, and the like. An actuating force-corresponding brake control portion is formed by a portion of the controller 50 that feeds the actual brake actuating force back and determines a duty ratio, and the like. Furthermore, a selecting portion is formed by a portion that stores the brake control portion-selecting routine illustrated in the flowchart of FIG. 6, a portion that executes the routine, and the like.

Although in the foregoing embodiment, it is determined in S3 in the brake control selecting program whether the wheel speed is greater than a set speed, it is also possible to determine whether the wheel speed is greater than a set speed and the vehicle running speed is greater than a set speed. Furthermore, if the determination in S2 is negative (if the slip is not excessively great), it is also possible to determine whether the anti-lock control is being executed for at least one wheel other than the wheel currently concerned. If the anti-lock control is being executed for at least one wheel, the actuating force-corresponding brake control may be executed for the wheel currently concerned. It is appropriate to avoid execution of the braking torque-corresponding brake control on the wheel currently concerned if the anti-lock control is being executed for at least one wheel other than the wheel presently concerned, because in such a case it is highly likely that the anti-lock control will also be executed for the wheel presently concerned.

Furthermore, if the slip is excessively great and the anti-lock control is not executed, that is, if despite an excessively great slip, the anti-lock control is not executed because the vehicle running speed is lower than the anti-lock control-prohibiting speed, it is also possible to prohibit the actuation of the electric drum brakes 32 of the right and left rear wheels RR, RL. If the vehicle running speed is lower than the anti-lock control-prohibiting speed, there occurs substantially no need to stop the vehicle with a great braking torque. The braking torque produced by the electric drum brakes 32 of the right and left rear wheels RR, RL is smaller than the braking torque produced by the electric disc brakes 22 of the right and left front wheels FR, FL. Furthermore, if the slip is excessively great and the wheel rotational speed is small, an actual braking torque cannot be detected with good precision. In such a case, therefore, it is desirable to prohibit the actuation of the electric drum brakes 32 of the rear wheels, since this measure reduces the deterioration in the control precision.

Furthermore, in a case where the anti-lock control is ended due to the vehicle running speed being reduced below the anti-lock control-prohibiting speed, it Is also possible to execute the actuating force-corresponding brake control even if the slip is not excessively great. In this case, it is highly likely that the vehicle will be stopped within a short time, that is, the wheel rotational speed will likely decrease to or below the set speed within a short time. Therefore, according to the routine described above, after the end of the anti-lock control, the braking torque-corresponding brake control and the actuating force-corresponding brake control are sequentially performed in that order. That is, the brake control mode is changed within a short time, which is not desirable.

Furthermore, although in the foregoing embodiment, one of the braking torque-corresponding brake control and the actuating force-corresponding brake control is selected based on at least one of the wheel rotational speed and the wheel slip state, it is also possible to make such a selection based on only one of the wheel rotational speed and the wheel slip state. Still further, although in the foregoing embodiment, the invention is applied to the braking torque control apparatus that controls the electric drum brakes, the invention is also applicable in substantially the same manner to a braking torque control apparatus that controls the electric disc brakes 22. Moreover, the invention is applicable to a braking torque control apparatus in a hydraulic brake that controls an electric control actuator capable of electrically controlling the hydraulic pressure.

The electric drum brake is not limited to the duo-servo type. The invention is also similarly applicable to various other types of electric drum brakes, for example, a two-leading type, a leading trailing type, a uni-servo type, etc.

In the anti-lock control, it is also possible to control the supplied current so that the braking torque becomes a maximum. The invention is also applicable to brake apparatuses that are not capable of anti-lock control. If the invention is applied to a brake apparatus incapable of anti-lock control, the actuating force-corresponding brake control is executed when the slip is excessively great, so that deterioration in braking stability can be reduced.

The invention is applicable to a vehicle in which all the four wheels are provided with drum brakes, a vehicle in which all the four wheels are provided with disc brakes, etc. Furthermore, the invention may be embodied in variously modified or improved forms based on knowledge of persons skilled in the art.

With regard to the selective switching between the braking torque-corresponding brake control and the actuating force-corresponding brake control, various switching conditions and switching modes used will be described in detail.

If a control of bringing the actual braking torque toward a target braking torque under a condition where the actual braking torque cannot be detected with good precision, there is a danger of the brake actuating force becoming excessively great. Therefore, under that condition, the braking torque-corresponding brake control is changed to the actuating force-corresponding brake control, as described above. Described below will be various methods for detecting a situation where the actual braking torque cannot be detected with good precision and, more particularly, a situation where detection of the actual braking torque is substantially impossible in relation to a stop of the vehicle.

Figure 10:
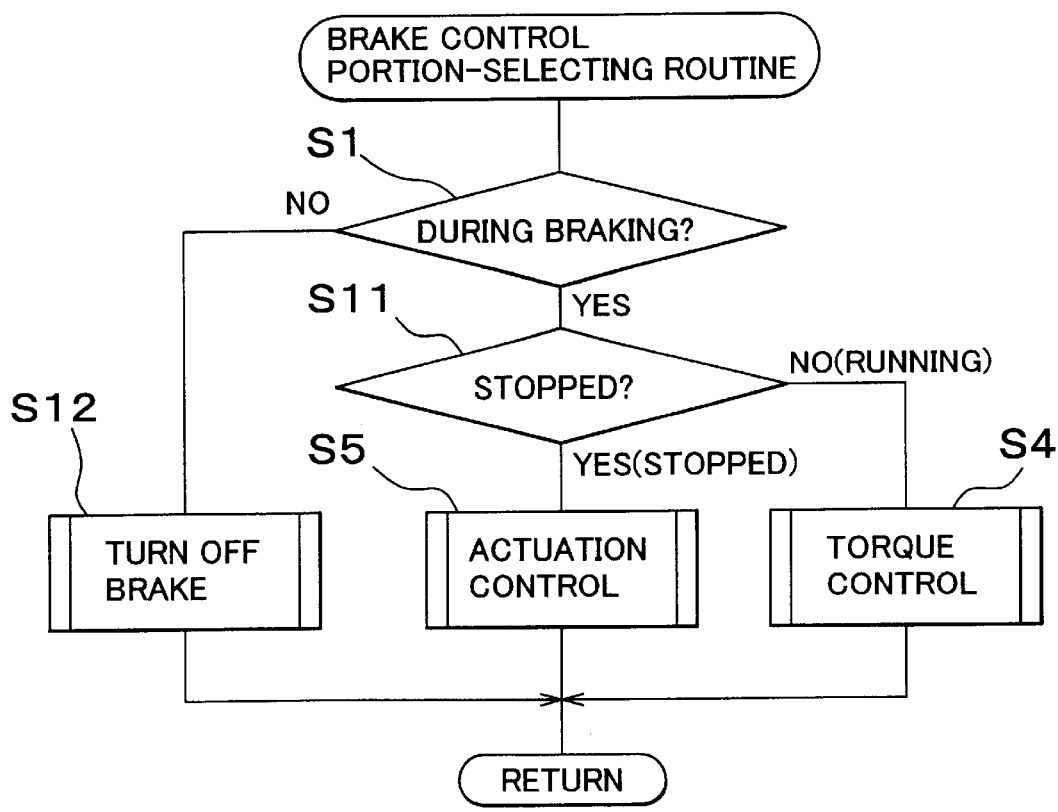
FIG. 10 is a flowchart illustrating a modification of the brake control portion-selecting routine illustrated in FIG. 6.

A brake control portion-selecting routine illustrated by the flowchart of FIG. 10 is stored in the ROM of the computer 300. This routine is executed by the CPU Of the computer 300. The brake control portion-selecting routine is executed separately for each wheel. In S1, the CPU determines whether the brake pedal 40 is being operated based on the state of the brake pedal switch 304, as in the foregoing embodiment. If the brake pedal 40 is not being operated, the negative determination is made in S1. Subsequently in S12, the CPU stops the supply of current to the electric motor 20 or 30, and discontinues the application of braking force from the electric brake 22 or 32 to the wheel.

If the brake pedal 40 is being operated and therefore the affirmative determination is made in S1, the CPU determines in S11 whether the vehicle is at a stop (whether the wheel speed is approximately "0"). The process of S11 is a process for determining whether there exists a situation where the actual braking torque cannot be detected with good precision (situation where detection of the actual braking torque is substantially impossible). This stop determination is made based on a quantity of decelerating state that indicates a decelerating state of the vehicle, such as the vehicle body speed, the wheel speed, the braking torque, or a differential of any one of these values, etc.

If "NO" in step S11, that is, if it is determined that the vehicle is not at a stop, that is, the vehicle is running, the CPU executes the braking torque-corresponding brake control in S4. The braking torque-corresponding brake control is executed as illustrated in the control block diagram of FIG. 4 as in the foregoing embodiment. More specifically, through the feedback control using the actual braking torque T detected by the strain sensor 312 or 314, the actual braking torque T applied to the wheel is controlled so as to become equal to a target braking torque T* that is determined in accordance with the amount of operation of the brake pedal 40.

Conversely, if "YES" in S11, that is, if it is determined that the vehicle is at a stop, the CPU executes the actuating force-corresponding brake control in S5. The actuating force-corresponding brake control is executed as illustrated in the control block diagram of FIG. 5, as in the foregoing embodiment. More specifically, through the feedback control using the actual value of current I through the electric motor 20 or 30 detected by the motor current sensor 310, the actuating force of the electric brake 22 or 32 is controlled so as to become equal to a target actuating force D* that is determined in accordance with the amount of operation of the brake pedal 40. In this case, the actuating force corresponds to the current. Therefore, it can be said that the actual value of current I through the electric motor 20 or 30 is controlled so as to equal a value of supplied current I* (target value of current I*) corresponding to the target braking torque that is determined in accordance with the amount of operation of the brake pedal 40. Hence, if the control block diagram of FIG. 5 is changed so that the actual value of current I, instead of the actuating force D, is controlled so as to equal the target value of current I* as indicated by a broken line in FIG. 5, no substantial difference is made.

In the foregoing embodiment and this modification, the actuating force-corresponding brake control is realized through the feedback control using the actual value of current I through (actual actuating force of) the electric motor 20 or 30 detected by the motor current sensor 310. However, if the current through the electric motor 20 or 30 can be controlled to the value of supplied current I* (target value of current I*) without executing the current feedback control, it is possible to control the current flowing through the electric motor 20 or 30, that is, the actuating force of the electric brake 22 or 32, only by the feedforward control. This fashion of control may be realized by omitting the current feedback loop in FIG. 5, and supplying the driver 322 with an instruction signal indicating a duty ratio that is determined based on the relationship with the value of supplied current I* (target value of current I*) in the block 13. In accordance with the signal indicating the duty ratio, the driver 322 is caused to control the current so that the value of supplied current I* (target value of current I*) flows through the electric motor 20 or 30.

Therefore, if the actual braking torque is substantially undetectable, for example, during a stop of the vehicle, the actuating force-corresponding brake control is executed. Thus, execution of the braking torque-corresponding brake control, which is inappropriate in that situation, is favorably avoided, so that the brake actuating force does not become excessively great.

Specific examples (1) to (6) of the stop determination in S11 will be described below.

(1) The wheel speed Vw is inputted from the wheel speed sensor 308. If the wheel speed Vw is less than or equal to a predetermined wheel speed Vwo (Vw≦Vwo), it is determined that the vehicle is at a stop. That is, if the detected wheel speed Vw is greater than the predetermined wheel speed Vwo, the negative determination (the vehicle is running) is made in S11. Subsequently in S4, the braking torque-corresponding brake control is executed. Conversely, if the detected wheel speed Vw is less than or equal to the predetermined wheel speed Vwo, the affirmative determination (the vehicle is at a stop) is made in S11. Subsequently in S5, the actuating force-corresponding brake control is executed. It may be advisable that the predetermined wheel speed Vwo be set to, for example, a very small value that makes it possible to consider the wheel to be approximately in a stopped state.

Instead of the wheel speed Vw, it is also possible to use a vehicle speed detected from the rotational speed of the output shaft of the transmission by the vehicle speed sensor 306. Furthermore, in a vehicle equipped with an ABS (anti-lock brake system), the vehicle speed estimated by the ABS may be used instead of the wheel speed Vw.

(2) The actual braking torque T detected by the strain sensor 312 or 314 (actual braking torque detecting device) is inputted. If the deviation E between the target braking torque T* and the input braking torque T (E=T*−T) is greater than or equal to a predetermined value Eo (E≧Eo), it is determined that the vehicle is at a stop. The target braking torque T* is calculated based on the operating force on (amount of operation of) the brake pedal 40 detected by the operating force sensor 302, as in the process of S4. That is, if the deviation E is less than the predetermined value Eo, the negative determination (the vehicle is running) is made in S11. Subsequently in S4, the braking torque-corresponding brake control is executed. Conversely, if the deviation E is greater than or equal to the predetermined value Eo, the affirmative determination (the vehicle is at a stop)is made in S11. Subsequently in S5, the actuating force-corresponding brake control is executed.

Figure 11:
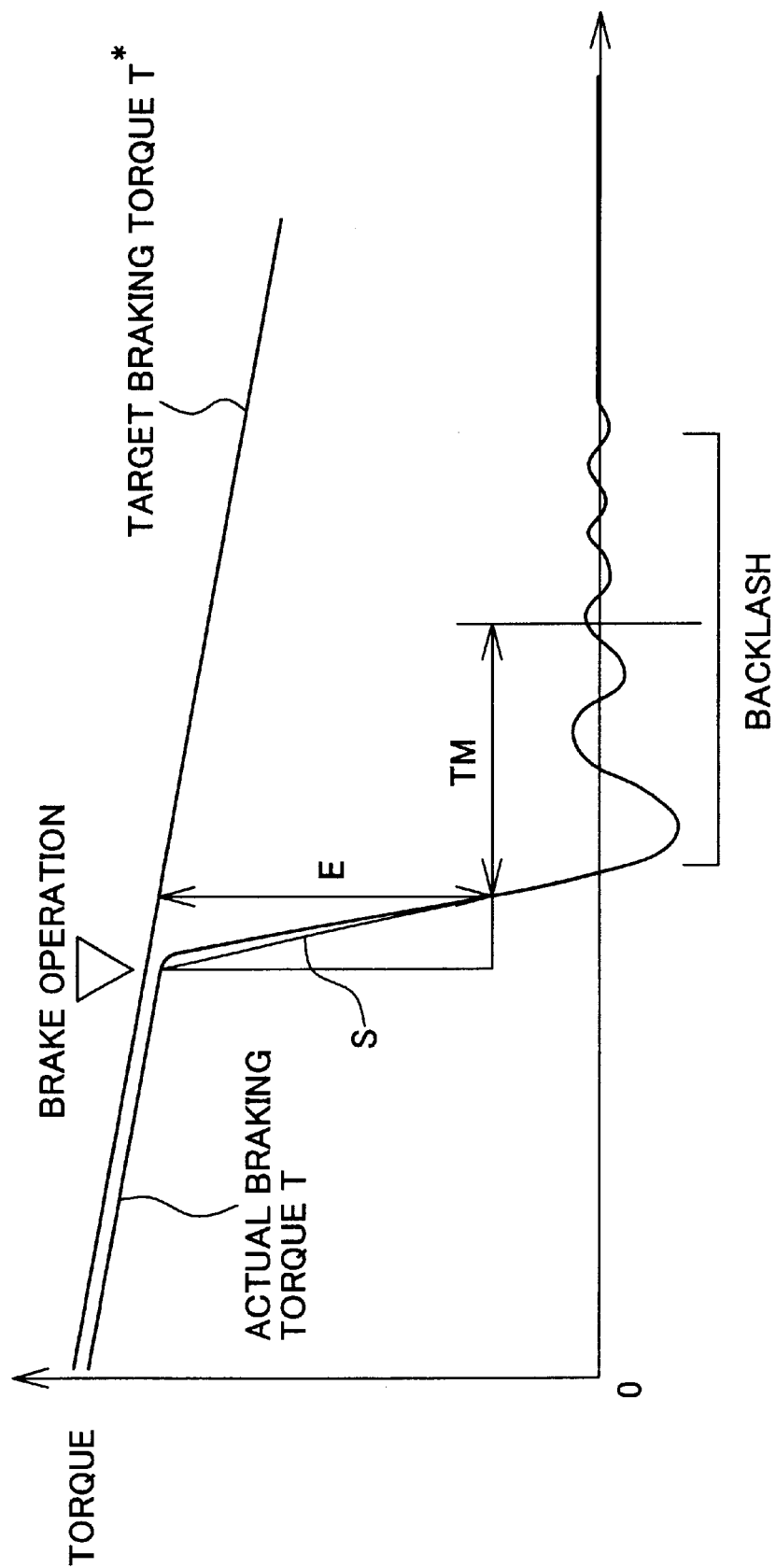
FIG. 11 is a graph indicating changes in the target braking torque and changes in the actual braking torque when a vehicle stops.

FIG. 11 indicates time-dependent changes in the target braking torque T* and the actual braking torque T when the brake pedal 40 is depressed while the vehicle is running. According to the diagram of FIG. 11, immediately before the vehicle stops due to the operation of depressing the brake pedal 40, that is, immediately before the wheel speed Vw becomes "0", the actual braking torque T detected by the strain sensor 312 or 314 sharply decreases whereas the set target braking torque T* is kept at large values. Therefore, the deviation E between the two braking forces T* and T can also be used as a basis for detecting whether the wheel speed Vw has become substantially "0".

Besides the aforementioned condition (E≧Eo), a condition that the condition (E≧Eo) continues for a predetermined length of time may be added. Therefore, the aforementioned stop determination can be more reliably performed. In this case, the time measurement is started at a time point when the deviation E reaches the predetermined value Eo. The time measurement is continued while the deviation E remains greater than or equal to the predetermined value Eo. When the measured time TM reaches or exceeds a predetermined time TMo, it may be determined that the vehicle has stopped.

Furthermore, the stop determination may also be performed based on the condition that the decreasing rate S of the detected actual braking torque T becomes less than or equal to a predetermined negative value −So, in addition to or instead of the aforementioned condition (E≧Eo). In this case, a differential S (=dT/dt) may be calculated through time differentiation of the detected actual braking torque T, and the calculated value S may be compared with the predetermined value −So. With regard to the differential S or the actual braking torque T used for the aforementioned comparison determination, it may be advisable to employ a low-pass filter process so as to remove small fluctuations.

(3) When the vehicle is stopped by depressing the brake pedal 40, the detected actual braking torque T starts to oscillate across "0", which is a reference value, due to backlash, as indicated in FIG. 11. When such oscillation is detected, it may be determined that the vehicle has stopped. In this case, it may be advisable that the detected actual braking torque T changing across the reference value from the positive side to the negative side or from the negative side to the positive side be defined as a condition for determining that the detected actual braking torque T has oscillated. Furthermore, the number of times that the detected actual braking torque T crosses the reference value may be counted. If the counted number of times reaching or exceeding a predetermined number is defined as a condition for determining a vehicle stop, the reliability of the detection increases.

(4) When the vehicle is stopped by depressing the brake pedal 40, the detected actual braking torque T sharply decreases as indicated in FIG. 11 and as described above. Therefore, the aforementioned stop determination may be made, when the detected actual braking torque T becomes equal to or less than a predetermined value To. The predetermined value To is a small value close.to "0".

If in addition to the aforementioned stop determination condition (T≦predetermined value To), the deviation E between the set target braking torque T* and the detected actual braking torque T (E=T*−T) becoming equal to or greater than the predetermined value Eo is defined as a condition for determining a vehicle stop, the detection precision in the stop determination improves.

(5) A fore-to-aft acceleration sensor 316 for detecting the acceleration G in the fore-to-aft directions of the vehicle may be connected to the controller 50 as indicated by a broken line in FIG. 1. Based on the fore-to-aft acceleration G detected by the sensor 316, the aforementioned stop determination is performed. When the vehicle is stopped by depressing the brake pedal 40, the fore-to aft acceleration G changes in a manner similar to the changing manner of the actual braking torque T indicated in FIG. 11.

Therefore, the stop determination may be made when the fore-to-aft acceleration G detected by the fore-to-aft acceleration sensor 316 becomes equal to or less than a predetermined value Go. The predetermined value Go is a very small value close to "0". Furthermore, the stop determination may also be made when the decreasing rate GS (dGS/dt) of the fore-to-aft acceleration G becomes equal to or less than a predetermined negative value −GSo, as in the case of the actual braking torque T.

Furthermore, since the detected fore-to-aft acceleration G also oscillates due to backlash at the time of a stop of the vehicle, the stop determination may also be made based on detection of oscillation of the fore-to-aft acceleration G, as in the case of the detected actual braking torque T. In this case, too, the number of oscillations of the detected fore-to-aft acceleration G may be added as a condition for the determination. If a stop determination condition based on the wheel speed and the like as in (1) is added in the stop determination based on the fore-to-aft acceleration G, the precision of the stop determination improves.

(6) The conditions mentioned above in (1) to (5) may be suitably combined to determine whether the vehicle is at a stop.

Figure 12:
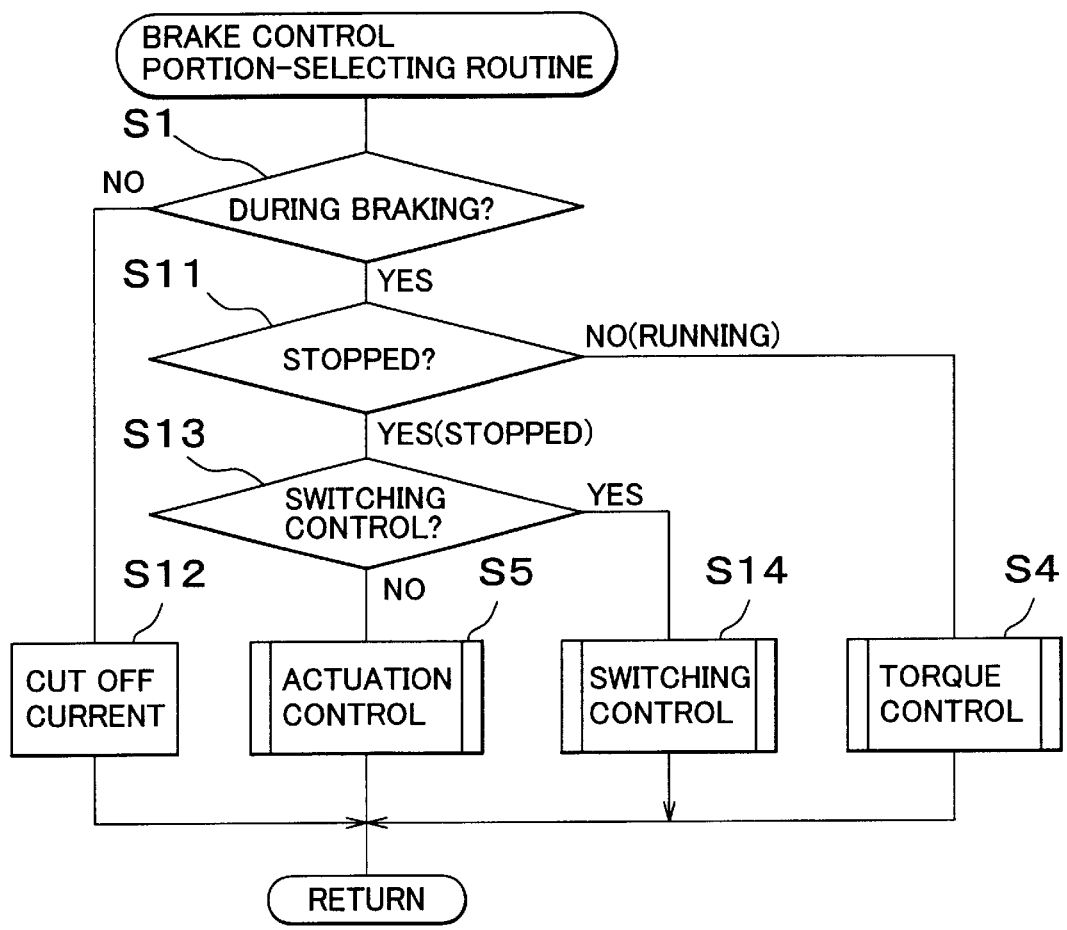
FIG. 12 is a flowchart illustrating another modification of the brake control portion-selecting routine illustrated in FIG. 6.

Next described will be an operation of the braking torque control apparatus of applying braking torque to each wheel by executing a brake control portion-selecting routine that is modified, as in the flowchart of FIG. 12, from the brake control portion-selecting routine illustrated in FIG. 10. The brake control portion-selecting routine illustrated in FIG. 12 is designed so that during the aforementioned stop determination, the brake control mode is gradually changed from the braking torque-corresponding brake control to the actuating force-corresponding brake control. This routine is stored in the ROM of the computer 300, and is executed by the CPU.

This brake control portion-selecting routine is obtained by adding processes of S13 and S14 to the brake control portion-selecting routine illustrated in FIG. 10. That is, if it is determined in S11 that the wheel (or the vehicle) is at a stop, it is determined in S13 whether to execute a switching control. In accordance with the determination in S13, the switching control is performed in S14, or the actuating force-corresponding brake control is executed in S5 as described above. In the switching control in S14, the braking torque-corresponding brake control is gradually changed to the actuating force-corresponding brake control.

Figure 13:
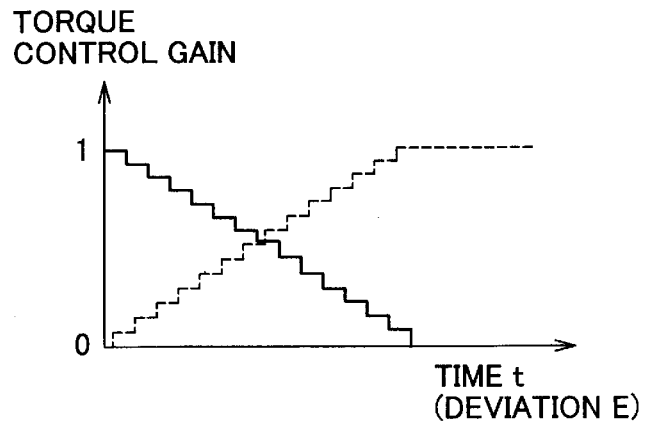
FIG. 13 is a graph indicating changes in the control gain of the braking torque-corresponding brake control and the actuating force-corresponding brake control achieved by executing the brake control portion-selecting routine illustrated in FIG. 12.

This switching control will be described further in detail. If it is presently determined in S11 that the vehicle is at a stop after it has been determined that the vehicle is running, it is determined in S13 that the switching control is to be executed. Due to the determination in S11, the program proceeds to S14 to continue the execution of the switching control in S14 until the switching control is completed. In S14, the control gain of the electric motor 20 or 30 by the braking torque-corresponding brake control is reduced from "1" to "0" gradually at every predetermined short time as indicated by a solid line in FIG. 13. On the other hand, the control gain of the electric motor 20 or 30 by the actuating force-corresponding brake control is increased from "0" to "1" gradually at every predetermined short time as indicated by a broken line in FIG. 13. Thus, during the switching control, the electric motor 20 or 30 is controlled by these two brake controls. After that, it is determined in S13 that the switching control is completed, so that the electric motor 20 or 30 is controlled by the actuating force-corresponding brake control in S5.

Specific contents of the aforementioned control will be described with reference to the control block diagram of FIG. 14.

A gain controller (block 21) is provided on a feedback path of the detected braking torque T, and a gain controller (block 22) is provided on a feedback path of the detected current I (detected actuating force). The two feedback control signals are added, and the result of addition is added to a signal that indicates a duty (output signal of a block 3). Thus, the electric motor 20 or 30 is driven and controlled.

Figure 14:
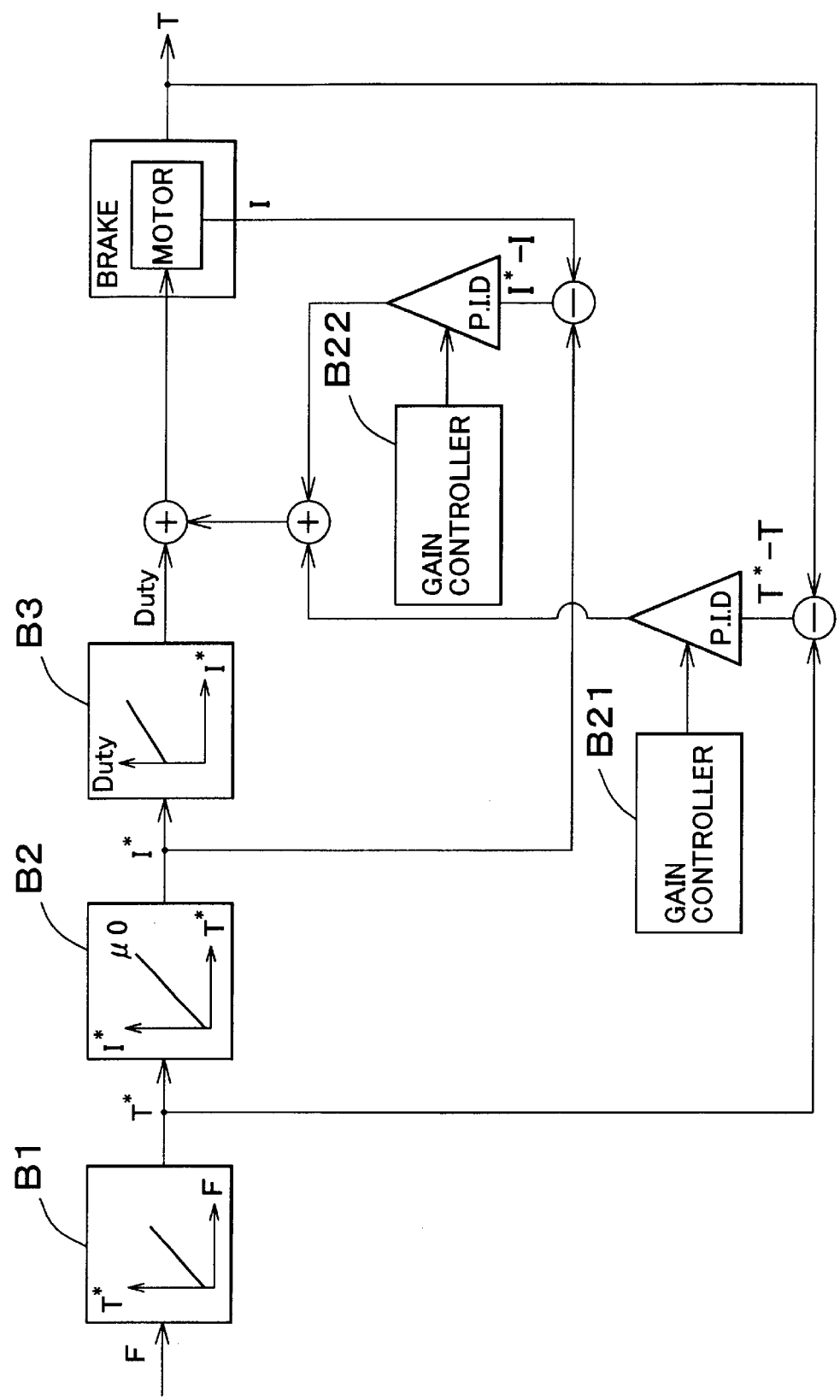
FIG. 14 is a block diagram illustrating the braking torque-corresponding brake control and the actuating force-corresponding brake control performed through execution of the brake control portion-selecting routine illustrated in FIG. 12.

According to the block diagram of FIG. 14, during the actuating force-corresponding brake control (the feedback control of actual current I), too, the value of supplied current (target value of current) I* is calculated by the blocks 1, 2, 3 in FIG. 4 instead of the blocks 11, 12, 13 in FIG. 5. That is, the value of supplied current (target value of current) I* is calculated in accordance with the target braking torque T*. Determining a value of supplied current (target value of current) I* for the actuating force-corresponding brake control in accordance with the target braking torque T* poses no problem since the braking torque and the actuating force are in a one-to-one relationship if the coefficient $\mu$ of friction between the brake linings 219a, 219b and the drum inner peripheral surface 204 is fixed (in the block 2 in FIG. 4, the friction coefficient is assumed to be the basic value $\mu$o).

Then, the gain controller of the block 21, in response to the stop determination, gradually changes the gain of the feedback path of the detected braking torque T from "1" toward "0", and then keeps the gain at "0". On the other hand, the gain controller of the block 22, in response to the stop determination, gradually changes the gain of the feedback path of the detected current I from "0" toward "1", and then keeps the gain at "1". In this fashion, the control of the electric motor 20 or 30 is gradually switched from the braking torque-corresponding brake control to the actuating force-corresponding brake control. Therefore, the unpleasant sensation of a driving person caused by a sharp change from the braking torque-corresponding brake control to the actuating force-corresponding brake control is avoided.

Although in the switching control, the two gains are individually changed with elapse of time, it is also possible to individually change the two gains in accordance with the deviation E between the target braking torque T* and the detected actual braking torque T (E=T*−T) That is, after the stop determination, the gain of the feedback path of the detected braking torque T is gradually changed from "1" toward "0" by the gain controller of the block 21 with increases in the deviation E. Following the time point when the deviation E reaches or exceeds a predetermined sufficiently great value, the gain is kept at "0". Simultaneously, the gain of the feedback path of the detected current I is gradually changed from "0" toward "1" by the gain controller of the block 22 with increases in the deviation E. Following the time point when the deviation E reaches or exceeds a predetermined sufficiently great value, the gain is kept at "1". Thus in accordance with the deviation E between the target braking torque T* and the detected actual braking torque T, the switching between the two gains gradually occurs. Therefore, the unpleasant sensation of a driving person caused by a switch from the braking torque-corresponding brake control to the actuating force-corresponding brake control is avoided.

In this case, however, if the switching control is started after the deviation E between the target braking torque T* and the detected actual braking torque T becomes great, the change in the gain at the start of the switching control may become excessively great. Therefore, among the stop conditions (1) to (6), suitable stop determination conditions in S11 in FIG. 12 in this case are conditions that provide a stop determination relatively early.

In the drive control of the electric motor 20 or 30 illustrated in the block diagram of FIG. 14, the actuating force-corresponding brake control is realized through the feedback control using the actual value of current I through the electric motor 20 or 30 detected by the motor current sensor 310. However, if the current through the electric motor 20 or 30 can be controlled to the value of supplied current I* (target value of current I*) without executing the current feedback control, it is possible to control the current flowing through the electric motor 20 or 30, that is, the actuating force of the electric brake 22 or 32, only by the feedforward control. That is, the current feedback loop including the block 22 in FIG. 14 is omitted, and the driver 322 is supplied with an instruction signal indicating a duty ratio that is determined based on the relationship with the value of supplied current I* (target value of current I*) in the block 3. In accordance with the signal indicating the duty ratio, the driver 322 is caused to control the current so that the value of supplied current I* (target value of current I*) flows through the electric motor 20 or 30.

Although the brake control-selecting routine of FIG. 12 has been described as a modification of the brake control-selecting routine of FIG. 10, the switching control executed by the brake control-selecting routine of FIG. 12 so as to gradually change the braking torque-corresponding brake control to the actuating force-corresponding brake control may also be applied to the brake control portion-selecting routine of FIG. 6. In this case, the switching control of S14 in FIG. 12 may be executed when the control is changed from the braking torque-corresponding brake control of S4 in FIG. 6 or the slip control of S7 in FIG. 6 to the actuating force-corresponding brake control of S5.

In the illustrated embodiment, the controller 50 is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. A braking torque control apparatus that controls a braking torque by controlling a brake for applying the braking torque to a wheel, the apparatus comprising:

a target braking torque determiner that determines a target braking torque based on an amount of brake operation performed by a driving person;

an actual braking torque detector that detects an actual braking torque applied to the wheel;

a braking torque-corresponding brake control portion that controls the brake so that the actual brake torque detected by the actual braking torque detector approaches the target braking torque determined by the target braking torque determiner;

a target actuating force determiner that determines a target actuating force of the brake based on the amount of brake operation;

an actual actuating force detector that detects an actual operating force of the brake;

a actuating force-corresponding brake control portion that controls the brake so that the actual actuating force detected by the actual actuating force detector approaches the target actuating force determined by the target actuating force determiner; and a selecting portion that selects the actuating force-corresponding brake control portion when the vehicle is in one state and the braking torque-corresponding brake control portion when the vehicle is in another state.

2. A braking torque control apparatus according to claim 1, wherein the brake is a drum brake including:

a brake drum that rotates together with the wheel; a pair of shoes disposed inside the brake drum, the shoes being retained to an unrotatable backing plate by an anchor so that the shoes are prevented from rotating together with the brake drum; and an actuator that brings an outer peripheral surface of each shoe into a friction engagement with an inner peripheral surface of the brake drum by moving the shoes away from each other, wherein the actual braking torque detector detects the actual braking torque applied to the wheel, based on a force acting on the anchor.

3. A braking torque control apparatus according to claim 2, wherein the actuator is an electric actuator that is actuated upon supply of an electric energy.

4. A braking torque control apparatus according to claim 1, wherein the brake comprises:

a brake drum that rotates together with the wheel;

a pair of shoes disposed inside the brake drum, the shoes being retained to a backing plate in such a manner that first end portions of the shoes that face each other are engaged with an anchor and the shoes are prevented from rotating together with the brake drum;

a strut provided so that the strut interconnects second end portions of the shoes so as to transmit a force acting on one of the shoes to another one of the shoes; and an actuator that brings an outer peripheral surface of each shoe into a friction engagement with an inner peripheral surface of the brake drum by moving the first end portions of the shoes away from each other, wherein the actual braking torque detector detects the actual braking torque applied to the wheel, based on a force acting on at least one of the anchor and the strut.

5. A braking torque control apparatus according to claim 4, wherein the actuator is an electric actuator that is actuated upon supply of an electric energy.

6. A braking torque control apparatus according to claim 1, wherein at a time of switching from a control performed by the braking torque-corresponding brake control portion to a control performed by the actuating force-corresponding brake control portion, the selecting portion gradually performs the switching.

7. A braking torque control apparatus according to claim 1, wherein the selecting portion switches from a control by the braking torque-corresponding brake control portion to a control by the actuating force-corresponding brake control portion when a state where the actual braking torque is below a torque level reliably detectable by the actual braking torque detector is established.

8. A braking torque control apparatus according to claim 7, wherein the state where the actual braking torque is below a torque level reliably detectable by the actual braking torque detector is detected based on a quantity of decelerating state that indicates a decelerating state of the vehicle.

9. A braking torque control apparatus according to claim 7, wherein a time when the state where the actual braking torque is below a torque level reliably detectable by the actual braking torque detector is established is a time when one of a wheel speed and a vehicle body speed becomes equal to or lower than a set speed.

10. A braking torque control apparatus according to claim 7, wherein a time when the state where the actual braking torque is below a torque level reliably detectable by the actual braking torque detector is established is a time when the wheel becomes a locked state.

11. A braking torque control apparatus according to claim 7, wherein a time when the state where the actual braking torque is below a torque level reliably detectable by the actual braking torque detector is established is a time when a deviation between the target braking torque determined and the actual braking torque detected by the actual braking torque detector becomes equal to or greater than a predetermined value.

12. A braking torque control apparatus according to claim 7, wherein a time when the state where the actual braking torque is below a torque level reliably detectable by the actual braking torque detector is established is a time when the actual braking torque detected by the actual braking torque detector starts to oscillate.

13. A braking torque control apparatus according to claim 7, wherein a time when the state where the actual braking torque is below a torque level reliably detectable by the actual braking torque detector is established is a time when the actual braking torque detected by the actual braking torque detector becomes equal to or less than a predetermined value.

14. A braking torque control method that controls a braking torque applied to a wheel, by using an electric actuator that generates an actuating force in accordance with a current supplied and an electric brake that is driven by the electric actuator to apply the braking torque to the wheel, the method comprising:

detecting an amount of brake operation performed by a driving person;

detecting an actual braking torque applied to the wheel;

a first step of determining a target braking torque based on the amount of brake operation detected, and feeding back the actual brake torque detected, and controlling a current flowing through the electric actuator so that the actual braking torque detected becomes equal to the target braking torque determined;

a second step of determining a target value of current based on the amount of brake operation detected, and performing a control such that a current equal to the target value of current determined is caused to flow to the electric actuator;

selecting first step when the vehicle is in one state and the second step when the vehicle is in another state, and controlling the brake by the step selected.

15. A braking torque control apparatus that controls a braking torque applied to a wheel, comprising:

an electric actuator that generates an actuating force in accordance with a current supplied;

an electric brake that is driven by the electric actuator to apply the braking torque to the wheel;

an amount-of-brake-operation detector that detects an amount of brake operation performed by a driving person;

an actual braking torque detector that detects an actual braking torque applied to the wheel;

a braking torque-corresponding brake control portion that determines a target braking torque based on the amount of brake operation detected, and feeds back the actual braking torque detected, and controls a current flowing to the electric actuator so that the actual braking torque detected becomes equal to the target braking torque determined;

an actuating force-corresponding brake control portion that determines a target value of current based on the amount of brake operation detected, and performs a control such that a current equal to the target value of current determined is caused to flow to the electric actuator; and a selecting portion that selects the actuating force-corresponding brake control portion when the vehicle is in one state and the braking torque-corresponding brake control portion when the vehicle is in another state.

16. A braking torque control apparatus according to claim 15, wherein the selecting portion switches from a control by the braking torque-corresponding brake control portion to a control by the actuating force-corresponding brake control portion when a state where the actual braking torque is below a torque level reliably detectable by the actual braking torque detector is established.

17. A braking torque control apparatus according to claim 16, wherein the state where the actual braking torque is below a torque level reliably detectable by the actual braking torque detector is detected based on a quantity of decelerating state that indicates a decelerating state of a vehicle.

18. A braking torque control apparatus according to claim 16, wherein a time when the state where the actual braking torque is below a torque level reliably detectable by the actual braking torque detector is established is a time when one of a wheel speed and a vehicle body speed becomes equal to or lower than a set speed.

19. A braking torque control apparatus according to claim 16, wherein a time when the state where the actual braking torque is below a torque level reliably detectable by the actual braking torque detector is established is a time when the wheel becomes a locked state.

20. A braking torque control apparatus according to claim 16, wherein a time when the state where the actual braking torque is below a torque level reliably detectable by the actual braking torque detector is established is a time when a deviation between the target braking torque determined and the actual braking torque detected by the actual braking torque detector becomes equal to or greater than a predetermined value.

21. A braking torque control apparatus according to claim 16, wherein a time when the state where the actual braking torque is below a torque level reliably detectable by the actual braking torque detector is established is a time when the actual braking torque detected by the actual braking torque detector starts to oscillate.

22. A braking torque control apparatus according to claim 16, wherein a time when the state where the actual braking torque is below a torque level reliably detectable by the actual braking torque detector is established is a time when the actual braking torque detected by the actual braking torque detector becomes equal to or less than a predetermined value.

23. A braking torque control apparatus according to claim 15, wherein at a time of switching from a control performed by the braking torque-corresponding brake control portion to a control performed by the actuating force-corresponding brake control portion, the selecting portion gradually performs the switching.

24. A braking torque control method that controls a braking torque by controlling a brake for applying the braking torque to a wheel, the method comprising:

determining a target braking torque based on an amount of brake operation performed by a driving person;

detecting an actual braking torque applied to the wheel;

a first step of controlling the brake so that the actual braking torque detected approaches the target braking torque determined;

determining a target actuating force of the brake based on the amount of brake operation;

detecting an actual actuating force of the brake;

a second step of controlling the brake so that the actual actuating force detected approaches the target actuating force determined; and selecting the first step when the vehicle is in one state and the second step when the vehicle is in another state, and controlling the brake by the step selected.

* * * * *